United States Patent [19]

Bähr

[11] Patent Number: 4,906,369
[45] Date of Patent: Mar. 6, 1990

[54] APPARATUS FOR DEWATERING SLUDGE AND SIMILAR SUBSTANCES

[76] Inventor: Albert Bähr, Am Hungerberg 10, D-6682 Ottweiler 2, Fed. Rep. of Germany

[21] Appl. No.: 110,817

[22] Filed: Oct. 21, 1987

[30] Foreign Application Priority Data

Oct. 21, 1986 [DE] Fed. Rep. of Germany ....... 3635766
Oct. 12, 1987 [DE] Fed. Rep. of Germany ....... 3734474
Oct. 15, 1987 [DE] Fed. Rep. of Germany ....... 3734974

[51] Int. Cl.$^4$ .............................................. B01D 33/04
[52] U.S. Cl. ..................................... 210/297; 100/118; 100/152; 210/386; 210/401
[58] Field of Search ............... 210/206, 216, 297, 386, 210/401; 100/118, 152

[56] References Cited

U.S. PATENT DOCUMENTS

| Re. 22,200 | 10/1942 | Richardson | 100/152 |
|---|---|---|---|
| 3,784,018 | 1/1974 | Hope et al. | 210/401 |
| 3,821,928 | 7/1974 | Sugita | 210/401 |
| 3,896,030 | 7/1975 | Bahr | 210/401 |
| 4,093,552 | 6/1978 | Guyer | 210/297 |
| 4,145,288 | 3/1979 | Crowe | 210/401 |
| 4,158,627 | 6/1979 | Ingemarsson | 210/386 |
| 4,159,947 | 7/1979 | Brooks et al. | 210/386 |
| 4,181,616 | 1/1980 | Bahr | 210/386 |
| 4,459,907 | 7/1984 | Sundeman | 100/118 |
| 4,563,278 | 1/1986 | Mutzenberg et al. | 210/401 |

FOREIGN PATENT DOCUMENTS

| 0063991 | 7/1986 | European Pat. Off. | |
| 2705285 | 9/1977 | Fed. Rep. of Germany . | |
| 3221435 | 10/1985 | Fed. Rep. of Germany . | |
| 2363524 | 5/1978 | France | 210/386 |
| 29597 | 2/1983 | Japan | 100/118 |
| 58-32600 | 2/1983 | Japan | 100/118 |
| 185598 | 10/1984 | Japan | 210/386 |
| 152396 | 8/1985 | Japan | 100/118 |
| 2031293 | 4/1980 | United Kingdom | 210/401 |

Primary Examiner—W. Gary Jones
Attorney, Agent, or Firm—Armstrong, Nikaido, Marmelstein, Kubovcik & Murray

[57] ABSTRACT

In an apparatus for dewatering sludge the sludge to be dewatered is continuously fed to a pre-dewatering stage and is subsequently transferred to an enclosed sludge chamber volume, which is intermittently moved past stationary pairs of pressure-applying plates. The pre-dewatering stage is consituted by a stationary dewatering container which serves also as a buffer between the means for the continuous fooding of sludge and the means for a discontinuous and intermittent transfer of the sludge to the sludge chamber volume. Owing to that design the plant has a low structural expenditure and is operable at a high dewatering rate.

56 Claims, 16 Drawing Sheets

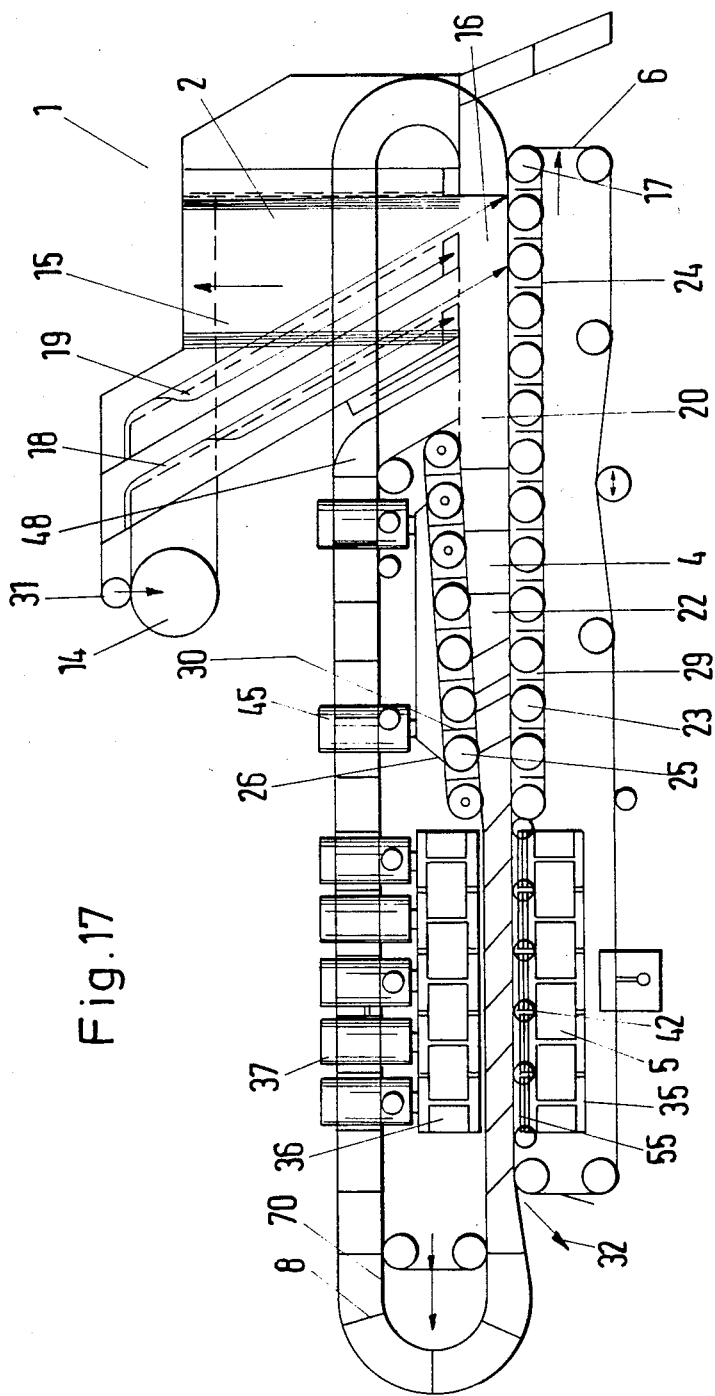

APPARATUS FOR DEWATERING SLUDGE AND SIMILAR SUBSTANCES

BACKGROUND OF THE INVENTION

1. Field of the Invention

This invention relates to apparatus for dewatering sludge and similar substances, particularly waste sludges and production sludges, wherein the sludge to be dewatered is continuously fed to the apparatus and is subsequently transferred to an enclosed sludge chamber volume, which is intermittently moved past stationary pressure-applying plates, comprising buffer means between the means for a continuous feeding of the sludge and the means for a discontinuous, intermittent transfer of the sludge.

2. Description of the Related Art

Such apparatus is known from European Pat. No. 0 063 991. In the sieve belt press shown there, the sludge to be dewatered is continuously fed to a substantially horizontal sieve belt. The upper sieve belt is then moved to the lower sieve belt and the sieve belts are moved along a meandering path between a large number of mutually opposite pressure-applying plates while the sieve belts are closed and the sludge to be dewatered is enclosed between the sieve belts. The sludge is dewatered between the pressure-applying plates while the sieve belts are stopped. In that case the buffer means disposed between the means for a continuous feeding of sludge and the means for a discontinuous, intermittent transfer of the sludge are provided in that the enclosed sludge chamber volume defined by the sieve belts is increased by movable roller means while the sieve belts are stopped. For that purpose, a translational movement is imparted to suitable deflecting rollers so as to increase the length of the sludge chamber volume.

The known apparatus affords a certain advantage because the sludge to be dewatered can be continuously fed to the apparatus although the sieve belts are moved intermittently. On the other hand, the buffer means provided there involve a relatively high expenditure as regards structure and control means.

SUMMARY OF THE INVENTION

For this reason it is an object of the present invention to simplify the known apparatus particularly as regards the buffer means and also to permit a more effective dewatering.

That object is essentially accomplished in accordance with the invention in that the buffer means consist of a stationary container, which constitutes a pre-dewatering stage, which is continuously fed with the sludge to be dewatered and one end of which communicates with the sludge chamber volume.

Said measures afford considerable advantages over the known state of the art: In the first place, in accordance with the present invention the buffer means can be provided without a need for any mechanically movable parts. When the sludge chamber volume is stopped and sludge is being continuously fed to the dewatering basket, the sludge level in the dewatering basket is rising continuously. As soon as the advance of the sludge chamber volume is resumed, the sludge level so the dewatering basket decreases correspondingly. A very large buffer volume can be provided in that proper dimensions are selected for the dewatering basket.

Another essential advantage afforded by the teaching of the invention resides in that the dewatering basket serving as a buffer volume constitutes a highly efficient pre-dewatering stage at the same time. While the belts are stopped, the rising sludge level causes the hydrostatic pressure in the dewatering basket to rise so that the standstill periods of the belts do not constitute lost or dead times relative to the dewatering of the sludge but result in a considerably intensified pre-dewatering in the pre-dewatering stage.

In accordance with a particularly advantageous feature of the invention the filter basket is disposed directly above a filter belt, which extends substantially horizontally adjacent to the point where the sludge is transferred and which defines one side of the sludge chamber volume. In such an arrangement the entire hydrostatic pressure of the sludge column in the dewatering basket may be directly applied to that filter belt so that the pre-dewatering of the sludge is distinctly intensified further.

In accordance with the invention the pre-dewatering stage may comprise: a mixing and reaction chamber having a sludge and flocculant inlet for a continuous feeding of sludge and flocculant to the mixing and reaction chamber, means for a continuous feeding of sludge from the mixing and reaction chamber to the dewatering basket, wherein the dewatering basket comprises at least one preferably cylindrical sieve basket having a vertical cylinder axis and serving for the hydrostatic dewatering of the sludge and the filtrate flows in the dewatering basket through the at least one sieve basket in a radial direction, and means for collecting and discharging the filtrate. In that case the pre-dewatering stage is substantially constituted by a combination of a mixer for sludge and flocculant, a succeeding dewatering basket, and an interposed reaction path.

In accordance with a particularly advantageous feature of the invention the mixing and reaction chamber is defined by a vertical U-shaped tubular body, the sludge and flocculant inlet is disposed at the upper end portion of one leg of the tubular body, and the upper end portion of the other leg of the tubular body communicates with the means for a continuous feeding of the sludge to the dewatering basket. It will be understood that other mixing means well known to those skilled in the art may also be used. If the mixing and reaction chamber is U-shaped, that leg which is associated with the sludge inlet constitutes the mixing zone and that leg which is associated with the sludge outlet constitutes a stilling zone.

The dewatering basket may comprise one or two sieve baskets. If only a single, upright sieve basket is provided, the sludge to be dewatered will be fed to the interior of the sieve basket and the filtrate will flow off to the outside and will be collected there and conducted away in a suitable manner. From a region below the sieve basket the pre-dewatered sludge is continuously or discontinuously removed and fed to means for its further processing.

But a particularly effective dewatering will be achieved if, in accordance with a particularly preferred feature of the invention, two concentric sieve baskets are provided and the sludge is fed to the annulus disposed between the two sieve baskets. In that case the sludge can be dewatered in radially inward and radially outward directions.

In order to intensify the dewatering action of the dewatering basket and to effectively prevent a gradual clogging of the openings of the sieve basket, the invention provides means for cleaning the at least one sieve basket. Said cleaning means are suitable constituted by a rotating scraper, which sweeps over a surface of the at least one sieve basket and may comprise, e.g., strip-shaped vertical brushes, which are in contact with the surface of the sieve.

The special design of the pre-dewatering stage explained hereinbefore will result in a particularly effective predewatering of the sludge to be dewatered and will thus very considerably increase the effectiveness of the entire apparatus.

In accordance with a further advantageous feature of the invention, means for controlling the rate at which the predewatered sludge is transferred to the sludge chamber volume are provided between the lower end of the dewatering basket and the sludge chamber volume. Said means are preferably constituted by a controllable or automatically controllable flap valve or a controllable or automatically controllable sliding valve. That flap valve or sliding valve will automatically control the rate of pre-dewatered sludge, e.g., in dependence on the percentage of solids in the sludge or on other operating conditions.

A particularly simple structure of the entire apparatus will be achieved if, in accordance with a further feature of the invention, the sludge chamber volume extends substantially along a straight line between the dewatering basket and the sludge cake discharge station. In that case the sludge chamber volume is preferably defined by and between a lower revolving filter belt and an upper revolving belt, which may preferably be a pressure-applying belt.

In accordance with a further feature of the invention the belts which define the sludge chamber volume extend through a high-pressure dewatering zone, which is straight and substantially horizontal and is defined by at least one pair of mutually opposite, horizontal, stationary pressure-applying plates, the belts defining the sludge chamber volume extend between the plates of said pair, and the plates of said pair are adapted to be intermittently moved toward each other in order to apply the dewatering pressure. A plurality of juxtaposed pairs of pressure-applying plates are preferably provided.

The lower pressure-applying plates are suitably rigidly mounted on the apparatus frame and the upper pressure-applying plates are adapted to be moved by hydraulic high pressure generators into engagement with the lower pressure-applying plates.

In accordance with a further preferred feature of the invention the pressure-applying plates are preferably opened by spring force. For that purpose the pressure-applying plates of each pair thereof are urged apart by compression springs to an open position when there is no application of pressure by the hydraulic high pressure generators and the belts defining the sludge chamber volume are adapted to advance between the pressure-applying plates in said open position.

Even when the pressure-applying plates are open, a tightly closed sludge chamber volume is ensured in that, in accordance with a further advantageous feature of the invention, mutually opposite pairs of pressure-applying rollers for guiding the belts which define the sludge chamber volume are arranged along the high-pressure dewatering zone. The pressure-applying rollers of the pairs thereof are spring-biased toward the sludge chamber volume. Said pairs of pressure-applying rollers serve for a low-friction guidance of the sludge chamber volume and for a selling compression of the belt means and ensure that the belt means defining the sludge chamber volume will be sealingly compressed during the transport phase.

The sludge chamber volume is laterally sealed adjacent to the high-pressure dewatering zone by the provision of sealing rings, which revolve about vertical axes and are intermittently driven in unison with the belt means.

Higher throughputs will be enabled in a particularly preferred embodiment in which the buffer means constitute a large-volume pre-dewatering chamber, the bottom of which is constituted by the filter belt.

Because an effective pre-dewatering may result already in that stage in a decrease of the volume almost to one-third, that design will result in a highly improved throughput because that part of the apparatus which succeeds will have to process much smaller quantities. When the sludge chamber volume is stopped, i.e., during the time in which high pressure is intermittently applied by the pressure-applying plates, the continuous transfer of sludge to the sludge chamber is continued so that the level of sludge rises continuously and the hydrostatic pressure in the sludge chamber is increased. This means that the pre-dewatering rate will even increase when the filter belt is stopped during the high pressure phase.

In accordance with a preferred development of the invention, additional filter surfaces are provided in the predewatering chamber and particularly consist of slotted sieves disposed in the pre-dewatering chamber.

That design may readily result in a decrease of the volume by 50%.

In a particularly preferred embodiment of the invention the pre-dewatering chamber is succeeded in the direction of conveyance by a medium-pressure stage, in which an upper pressure-applying belt runs up on the sludge which is being conveyed.

Specifically, it is preferred in that case that the pressure-applying belt consists of a flight belt that is provided with protruding transverse webs, which are secured to the belt. In that case the sludge is treated virtually in batches and can no longer yield forwardly or rearwardly during the application of pressure.

It may be desirable to associate the filter belt also with protruding transverse webs.

In both cases the protruding transverse webs are preferably pivoted and/or flexible.

In specific embodiments it may be desirable to provide two medium-pressure stages which are connected in series.

It will be particularly preferable to support the filter belt and the pressure-applying belt in the medium-pressure stage on a multiplicity of pressure-applying rollers. In that case the pressure applied by the pressure-applying rollers can desirably be altered.

In a particularly preferred embodiment of the invention the upper and/or the lower rollers are respectively mounted in a common mounting frame, which is pivoted at one end, and pressure generators are provided for imparting a pivotal movement to the frame. It will be understood that such an arrangement will constitute a genuine medium-pressure stage by which much higher pressures can be applied than in known medium-pressure stages. Owing to special nature of the discontinuously operable means which succeed the pre-dewatering stage, the time in which all belts defining the sludge chamber volume during the pressure-applying stroke in the high-pressure stage are stopped in any case during the pressure-applying stroke in the high-pressure stage may be utilized to apply a higher pressure also in the medium-pressure stage. This can desirably be effected in that the sets of pressure-applying rollers mounted in the common mounting frames are moved toward each other by the pressure generators. There is virtually no upper limit to the pressure which can be applied because the belts are stopped at that time so that there is no relative movement and a higher wear of the filter belts need not be feared. At the same time, the protruding transverse webs provided in accordance with the invention ensure that the sludge cannot move back opposite to the direction of conveyance as the pressure is increased.

Specifically, it will be preferred to provide supporting bars made of a low-friction material between adjacent pressure-applying rollers. In a particularly preferred embodiment said supporting bars are so disposed between the pressure-applying rollers that the respective bars are opposite to the upper or lower pressure-applying roller so that a uniform support in the planes of the filter belt and of the pressure applying belt will be achieved during the pressure stroke in the medium-pressure stage.

It may be desirable to spring-cushion the supporting bars.

The pressure generators in the medium-pressure stage may preferably consist of hydraulic cylinders which are operable during the pressure stroke in the high-pressure stage, i.e., during the standstill of the belts.

In accordance with a particularly preferred development of the invention the high-pressure stage is so designed that the filter belt lies on a plate which has open-topped filtrate channels and is provided on a lower stationary pressure-applying plate.

It will be desirable to provide additional pressure-applying rollers, which protrude through openings above the surface of the plate. The plate is desirably made of a low-friction plastic or rubber. With that development of the invention, the co-revolving supporting belts used in known designs may be eliminated because the provision of supporting belts has proved desirable in practice particularly in the high-pressure zone. In the described embodiment of the invention a stationary supporting belt section is virtually provided in the high-pressure stage so that considerable savings in structure and in operation will be achieved. That feature can be adopted because a relative movement of the plate formed with the filter passages and the filter belts takes place in the high-pressure zone only when the high-pressure stage is open.

It will be understood that in a modified embodiment of the invention the filter belt may be supported on a co-revolving supporting belt, which has open-topped filtrate channels, which extend at an angle to the direction of conveyance.

In certain embodiments of the invention the flight belt extends through a lock chamber as it enters the medium-pressure stage, i.e., at the transition between the predewatering chamber and the medium-pressure stage. Owing to that lock chamber, the sludge, which is still comparatively liquid in that region, cannot move opposite to the direction of movement of the flight belt.

The lock chamber is preferably defined by a surface portion which is opposite to and spaced from the flight belt and which contacts the free top edges of the protruding transverse webs. As a result, the transition between the predewatering chamber and the medium-pressure stage is constantly sealed by at least one protruding transverse web.

Further advantageous features of the invention will become apparent from the remaining dependent claims in conjunction with the following description.

Those means which are provided in accordance with the invention and constitute the high-pressure dewatering zone distinguish by having a particularly simple mechanical structure, a high stability and a most effective dewatering action. The decrease of the sludge volume by the pre-dewatering is utilized to permit a continuous transfer of sludge in spite of the intermittent discharge of the dewatered sludge cake.

An essential feature of the dewatering apparatus is seen in that the pre-dewatered sludge is moved along a straight horizontal path from adjacent to the pre-dewatering stage to the sludge cake discharge station.

BRIEF DESCRIPTION OF THE DRAWINGS

A preferred illustrative embodiment of the invention will now be described more in detail with reference to the semi-diagrammatic drawing, in which FIGS. 14 to 17 are elevational views which are similar to FIG. 5 and illustrate various embodiments of the invention.

The dewatering apparatus comprises a pre-dewatering stage 100, which is succeeded in the direction A of the sludge transport by a wedge-shaped dewatering stage 200, which is succeeded by a high-pressure dewatering zone 300.

Figure 1:
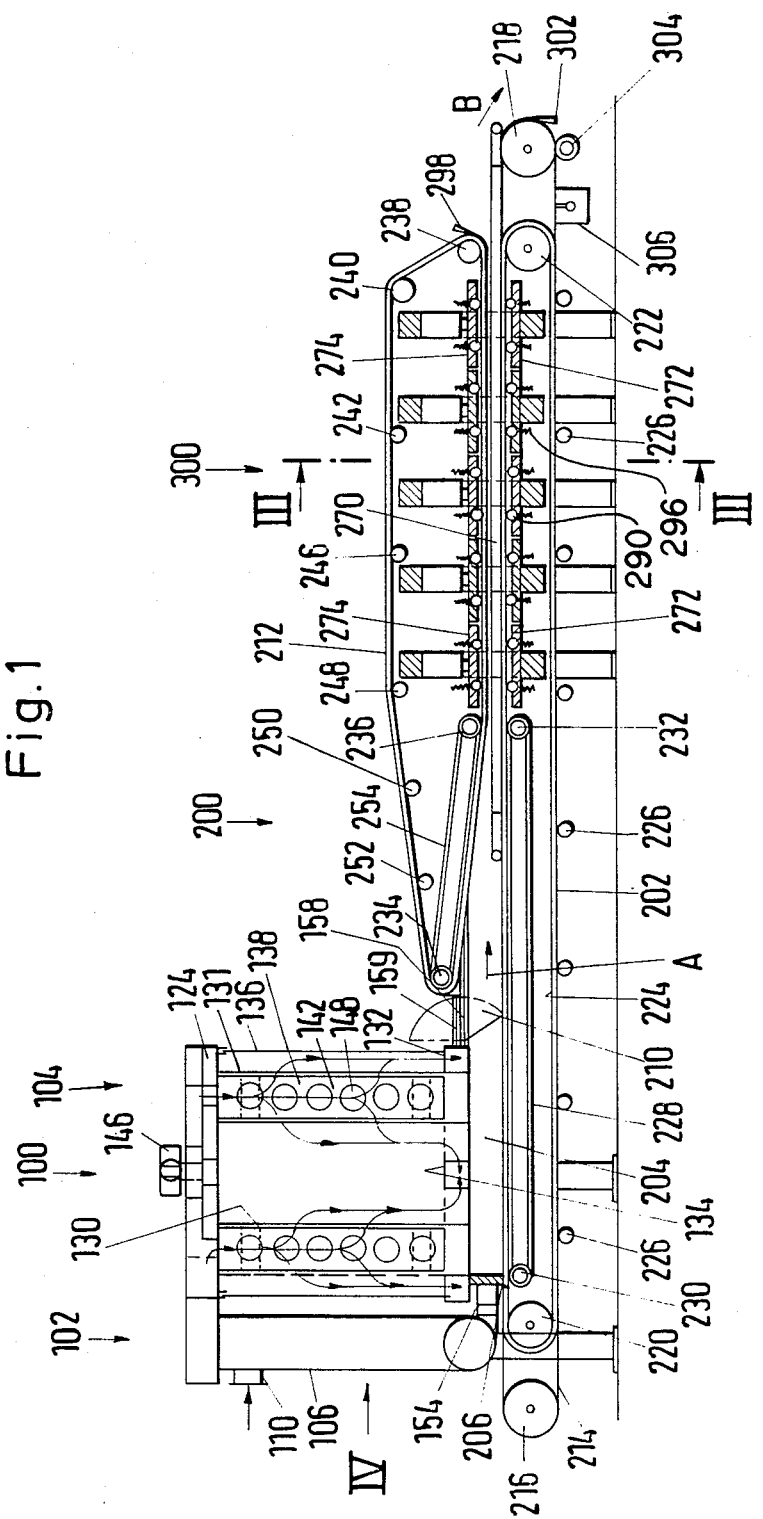
FIG. 1 is a section side elevation showing the dewatering apparatus in accordance with the invention.
Figure 4:
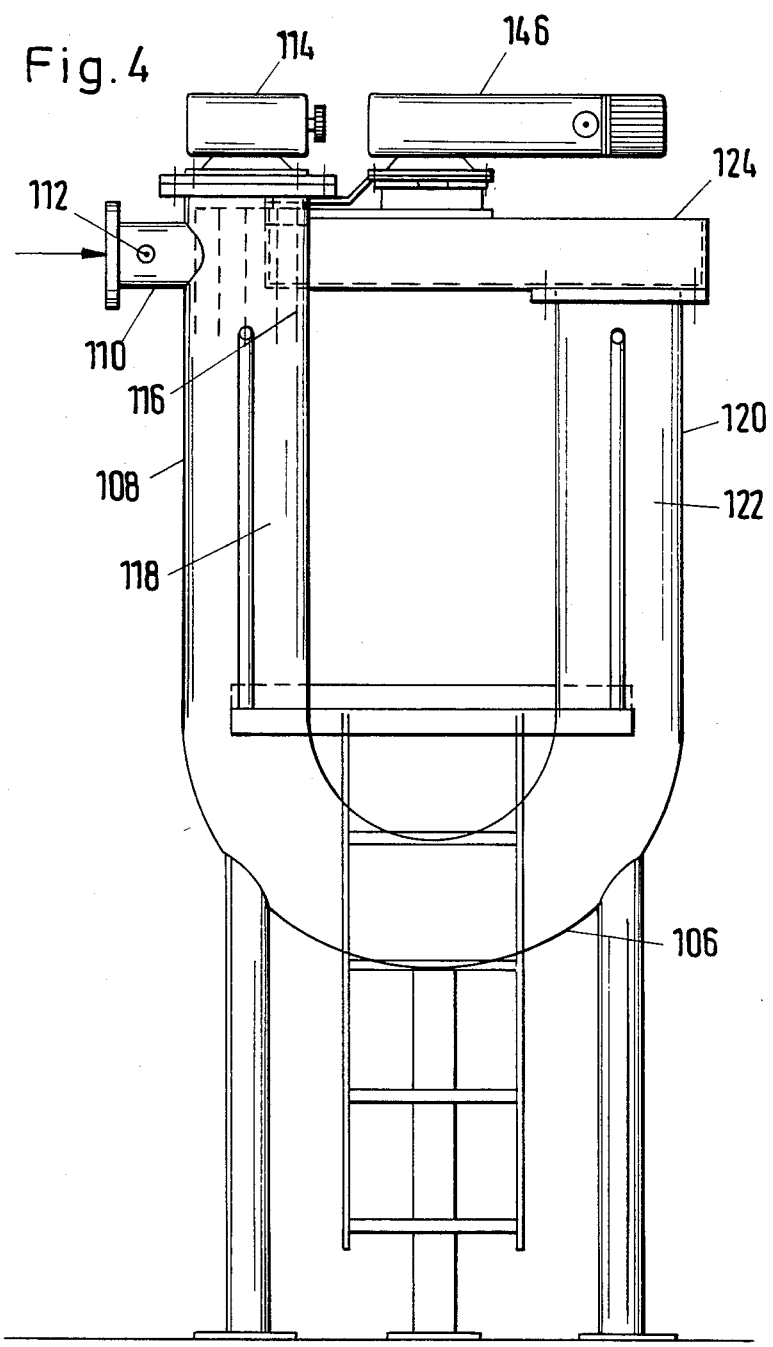
FIG. 4 is an end elevation showing the pre-dewatering station of FIG. 1 viewed in the direction of the arrow IV.

The pre-dewatering stage 100 is semi-diagrammatically shown particularly in FIGS. 1 and 4 and comprises as essential components a mixing and reaction chamber 102, and a dewatering basket 104, which communicates with the chamber 102. The mixing and reaction chamber 102 is defined by an upright U-shaped tubular body 106 and in the illustrative embodiment shown has a height of 160 cm and a width of 100 cm. One leg 108 of the tubular body 106 is provided with a tubular inlet port 110, which is used to supply the tubular body 106 through the metering means 112 with the sludge that is to be dewatered and to which chemical additives, particularly flocculant, have been admixed. An automatically controllable gearmotor 114 is flanged to the top end of the leg 108 and drives a stirring wheel 116, which is disposed inside the leg 108 adjacent to the tubular inlet port 110 and ensures an effective mixing of the sludge and flocculant. For this reason the space defined by the leg 108 is also described as a mixing and stirring zone 118.

The other leg 120 of the U-shaped tubular body 106 serves to still the substrate which has been stirred in the zone 118 and thus defines a so-called stilling zone 122. The upper end portion of the other leg 120 is arranged at such an elevation relative to the dewatering basket 104 so that the sludge leaving the upper end portion of the other leg 120 overflows freely to the upper top end of the dewatering basket 104.

The top end of the leg 120 of the U-shaped tubular body 106 terminates approximately on the level of the bottom of the inside surface of the tubular inlet port 110 and communicates with an open-topped channel system 124, which receives the freely overflowing sludge which after an addition of flocculant has been fed through the tubular inlet port 110 to the tubular body 106.

The sludge to be dewatered is fed through the channel system 124 to the dewatering basket 104, which comprises two vertical concentric sieve baskets 130, 131, which have a vertical axis and a height of about 150 cm. The sludge to be dewatered is conducted in the channel system 124 into the annulus provided between the sieve baskets 130, 131. Owing to the increasing hydrostatic pressure of the suspension the sludge is dewatered through the openings of the sieve baskets 130, 131 inwardly through the inner sieve basket 130 and outwardly through the outer sieve basket 131. A collecting trough 132 is provided at the lower end of the sieve baskets 130, 131 and extends around the sieve basket 131 and serves to receive and collect the filtrate which has passed through the sieve openings. Similar collecting troughs 134 are provided inside the inner sieve basket 130 and serve to receive the inwardly dewatered filtrate. The filtrate which has been received and collected is discharged through a discharge line, which communicates with the collecting troughs.

The sieve baskets 130, 131 preferably consist of steel and have suitable dewatering structures. They may particularly consist of slotted sieves. A cloth 136 serving as a splash guard is provided outside the sieve basket 131 and spaced therefrom and is secured to the channel system 124. The lower ends of the cloth 136 are disposed inside the collecting trough 132.

Cleaning means 138 are disposed inside the sieve basket 130 and comprise four vertical vanes 142, which extend radially outwardly and have inner and outer vertical edges. Strip-shaped brushes are secured to said inner and outer edges and are in contact with the inside surface of the sieve basket 131 and with the outside surface of the sieve basket 130. The vanes 142 are driven in unison by means of a gearmotor 146, which is flange-mounted above the sieve baskets 130, 131. The rotating cleaning means 138 will activate the filter surface of the sieve baskets 130, 131 in that the deposited solids are continually scraped off so that the sieve openings will be kept open. Circular apertures 148 are formed in the radially extending vanes 142 and are distributed throughout the height of the vanes and constitute baffles for the sludge.

The base of the U-shaped tubular body 106 is connected to the space disposed below the sieve baskets 130, 131 by a pipeline 154, which is adapted to be closed by means of a sliding valve. As a result, the tubular body 106 can be emptied in a simple manner in case of need.

As is distinctly apparent particularly from FIGS. 1 and 2, the dewatering basket 104 is disposed above belt means which are generally designated 202 and the design of which will be described more in detail hereinafter. As is particularly apparent from FIG. 2 the space 204 between the bottom end of the dewatering basket 104 and the opposite surface of the lower belt means 202 is laterally sealed by a sheet metal element 206 in such a manner that the pre-dewatered sludge which emerges from the dewatering basket 104 cannot yield to the left in FIG. 1 nor toward the side but can be entrained by the belt means 202 in the direction of the arrow A. The sealing plate 206 extends on both sides of the belt means 202 as far as to the discharge end of the wedge-shaped dewatering stage 200 or to the receiving end of the high-pressure dewatering stage 300. A top cover plate 208 succeeds the dewatering basket 104 on the right in FIGS. 1 and 2 and ensures that the pre-dewatered sludge will be conducted in a closed passage 210.

A means 158 for controlling the rate of the pre-dewatered sludge can, for example, be a controllable flap valve, automatically controllable flap valve, controllable sliding valve or automatically controllable sliding valve. Means 158 is disposed in the closed passage 210 between the wedge-shaped dewatering stage 200 and the dewatering basket 104 and may selectively be used to entirely close or entirely or partly open the passage 210 in dependence on the mode of operation of the plant and on the liquid content of the pre-dewatered sludge. The interior of the passage 210 is accessible from the outside through a hinged inspection lid 159, which is disposed above the flap valve 158.

The pre-dewatered sludge which has flowed through the passage 210 enters the wedge-shaped dewatering stage 200, in which upper belt means generally designated 212 are disposed, which are moved in synchronism with the lower belt means 202 and extend at such an acute angle to the lower belt means 202 that a wedge-shaped tapering dewatering space is formed. A lateral seal adjacent to the wedge-shaped dewatering stage 200 is provided by the laterally disposed sheet metal element 206. The wedge-shaped dewatering stage 200 is succeeded by the high-pressure dewatering stage 300, which will be described more in detail hereinafter.

The lower belt means 202 comprise an endless filter belt 214, which trained around two reversing pulleys 216, 218 and between said pulleys extends along a substantially horizontal, straight line. The filter belt 214 is supported by a supporting belt, which is disposed inside the filter belt 214 and revolves in unison therewith and is trained around reversing pulleys 220, 222 and provided with suitable dewatering structures, such as channels and the like, for a removal of filtrate and for this reason will be described as a channel belt 224. The lower course of the lower belt means 202 is supported by supporting rollers 226. The upper course of the lower belt means 202 is supported adjacent to the predewatering stage 100 and the wedge-shaped dewatering stage 200 by a chain link belt 228, which revolves in unison with the lower belt means 202 and is trained around two reversing pulleys 230, 232 inside the closed loop that is formed by the channel belt 224.

In the present embodiment the upper belt means consist of a smooth pressure-applying belt 212. From a reversing pulley 234, which is disposed close to the inspection lid 159, the upper pressure-applying belt is downwardly inclined in the direction of the arrow A and extends towards the reversing pulley 236, which is opposite to the reversing pulley 232. Thereafter the pressure-applying belt 212 is parallel to the lower belt means 202 as far as to a deflecting roller 238, which is opposite to the reversing pulley 222 and defines the rear end of the high-pressure dewatering stage 300. The pressure-applying belt 212 then returns over further deflecting rollers 240, 242, 246, 248, 250, 252 as far as to the reversing pulley 234. The pressure-applying belt is supported in the wedge-shaped dewatering stage 200 by another chain link belt 254, which revolves in unison with the pressure-applying belt 212 and is trained around the reversing pulleys 234, 236.

In the high-pressure dewatering stage 300 the sludge chamber volume is laterally sealed by endless sealing rings 256, 258, which are disposed on opposite sides of the sludge chamber volume and revolve in unison with the belt means 202, 212. The sealing rings 256, 258 are trained around deflecting rollers 260, 262, 264, 266 having vertical axes of rotation so that the sealing rings 256, 258 revolve along a horizontal orbit, as is particularly distinctly apparent from FIG. 2. A plurality of supporting rollers 268 are provided for supporting the returning outer portions of the sealing rings 256, 258, see particularly FIG. 3.

It is apparent that in the high-pressure dewatering stage 300 the sludge chamber volume 270 is enclosed at its top and bottom by the upper and lower belt means 212 and 202, respectively, and on the sides by the co-revolving sealing rings 256, 258.

In the high-pressure dewatering stage 300 the sludge chamber volume 270 extends through a number of pairs of stationary pressure-applying plates. Each of said pairs consists of a fixedly mounted lower pressure-applying plate 272 and a vertically movable upper pressure-applying plate 274, which is exactly opposite to the lower pressure-applying plate 272. A clamplike frame 276 is associated with the pressure-applying plates 272, 274 of each pair. As has been mentioned, each lower pressure-applying plate 272 is fixedly mounted on the lower crosspiece 278 of the frame 276. Two hydraulic cylinders 282 are secured to the upper crosspiece 280 of the frame 276 on opposite sides and have pistons 284, which act downwardly in a vertical direction and may cooperate with the upper pressure-applying plate 274 to force it under a high pressure toward the lower pressure-applying plate 272 when this is required so that the sludge contained in the sludge chamber volume between the pressure-applying plates will then be dewatered under a high pressure. The resulting pressure forces applied are kept within the frame system and do not apply a load on the foundations.

Figure 2:
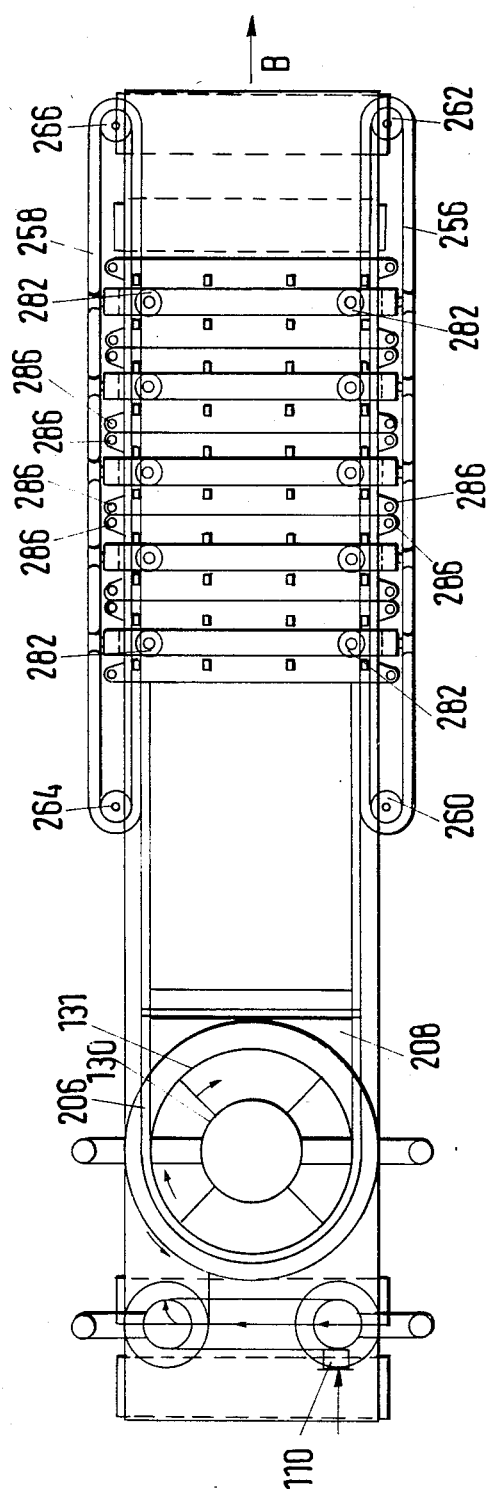
FIG. 2 is a top plan view showing the apparatus of FIG. 1.
Figure 3:
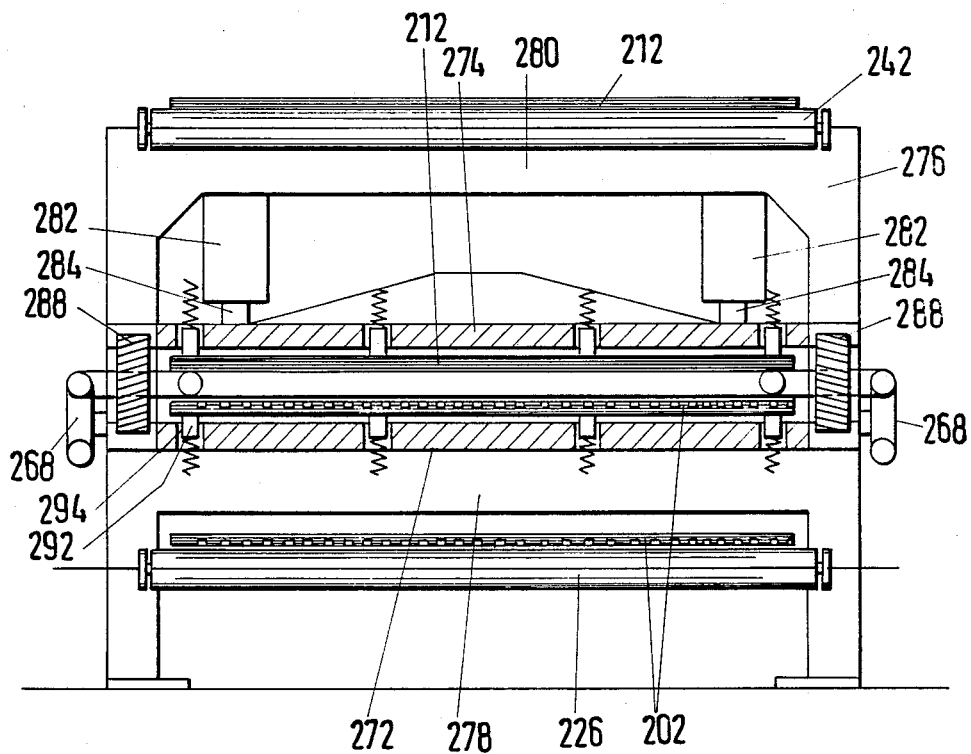
FIG. 3 is a section view taken on line III—III in FIG. 1.

As is particularly apparent from FIG. 2, each of the pressure-applying plates 272, 274 is provided on either side at each of its forward and rear ends with an arm 286, which extends outwardly in the plane of the pressure-applying plate, and a compression spring 288 is held under stress between mutually opposite arms of mutually opposite pressure-applying plates. When the pressing action has been terminated, the compression springs 288 automatically lift the upper pressure-applying plates 274 from the lower pressure-applying plates 272 so that the belt means can then be advanced. The lower and upper belt means are guided by mutually opposite pairs 290, 292 of pressure-applying rollers. Eight pairs of pressure applying rollers are provided per pair of pressure-applying plates in the present illustrative embodiment. Said pressure-applying rollers extend through corresponding apertures 294 in the pressure-applying plates. The pressure-applying rollers 290, 292 of each pair are biased toward each other by suitable spring elements 296. This will ensure that the sludge chamber volume will remain sealed under the pressure applied by the pairs of pressure-applying rollers even when the upper pressure-applying plates 274 have been lifted.

After the high-pressure dewatering stage 300 the dewatered sludge cake is discharged in the direction of the arrow B. A scraper 298 is provided adjacent to the deflecting roller 238 and serves to clean the pressure-applying belt 212. Another scraper 302 is provided adjacent to the reversing pulley 218 and just as the succeeding cleaning brush 304 and the washing nozzles 306 succeeding said brush serves to clean the filter belt.

During the operation of the plant the sludge and the flocculant are continuously fed to the mixing and reaction chamber 102. The sludge overflows freely through the channel system 124 into the annulus between the two sieve baskets 130, 131 of the dewatering basket 104. The filtrate flows off from the annulus in inward and outward directions and is collected and discharged by the collecting troughs 132, 134. The sludge contained in the annulus flows through the same and continuously delivers filtrate. The bottom of the annulus is defined by the horizontal filter belt 214 and adjacent to that filter belt the fully hydrostatic pressure is effective as a filtration pressure. The flap valve 158 provided at the outlet of the pre-dewatering stage controls the entrance of the sludge into the wedge-shaped dewatering stage 200. The continuous decrease of the volume of the sludge in the pre-dewatering stage and in the wedge-shaped stage is due to the removal of the filtrate and has the result that the volume of the sludge entering the high-pressure dewatering stage 300 is only 20 to 30% of the original volume, depending on the nature of the sludge. This means that the volume has been decreased to between one-third and one-fifth.

The feeding of sludge, the transport of sludge and the dewatering in the pre-dewatering zone are continuously effected. The transport through and the dewatering in the wedge-shaped stage and in the high-pressure dewatering zone are intermittently effected. The transport through and the dewatering in the high-pressure dewatering zone are intermittently effected. When the filter belt is stopped during the dewatering in the high-pressure dewatering stage, the annular volume in the dewatering basket 104 in the pre-dewatering stage 100 serves as a sludge buffer. Whereas all pressure-applying elements of the high-pressure stage, such as the pressure-applying plates and hydraulic cylinders, are fixed in position in the machine in that they do not move in unison with the filter belt, the filter belt advances only with a timing corresponding to the adjustable dewatering period and in increments corresponding to the length of the high-pressure dewatering stage.

The sludge which has been dewatered by the high-pressure dewatering stage is discharged from the machine while the high-pressure dewatering stage is filled with the sludge coming from the wedge-shaped stage. As a result, the sludge level in the dewatering basket of the pre-dewatering stage decreases and will rise again during the dewatering period in the high-pressure dewatering stage.

By means of time limit and pressure-responsive relays the application of pressure in the high-pressure dewatering stage can be adjusted as regards the magnitude of the pressure applied and the time of pressure application. The length of the high-pressure dewatering stage can be varied as required. Besides, the overall length of the high-pressure dewatering stage may be divided into several functional sections for effecting, e.g., high-pressure dewatering, washing, re-dewatering, blasting with compressed air, etc.

Figure 5:
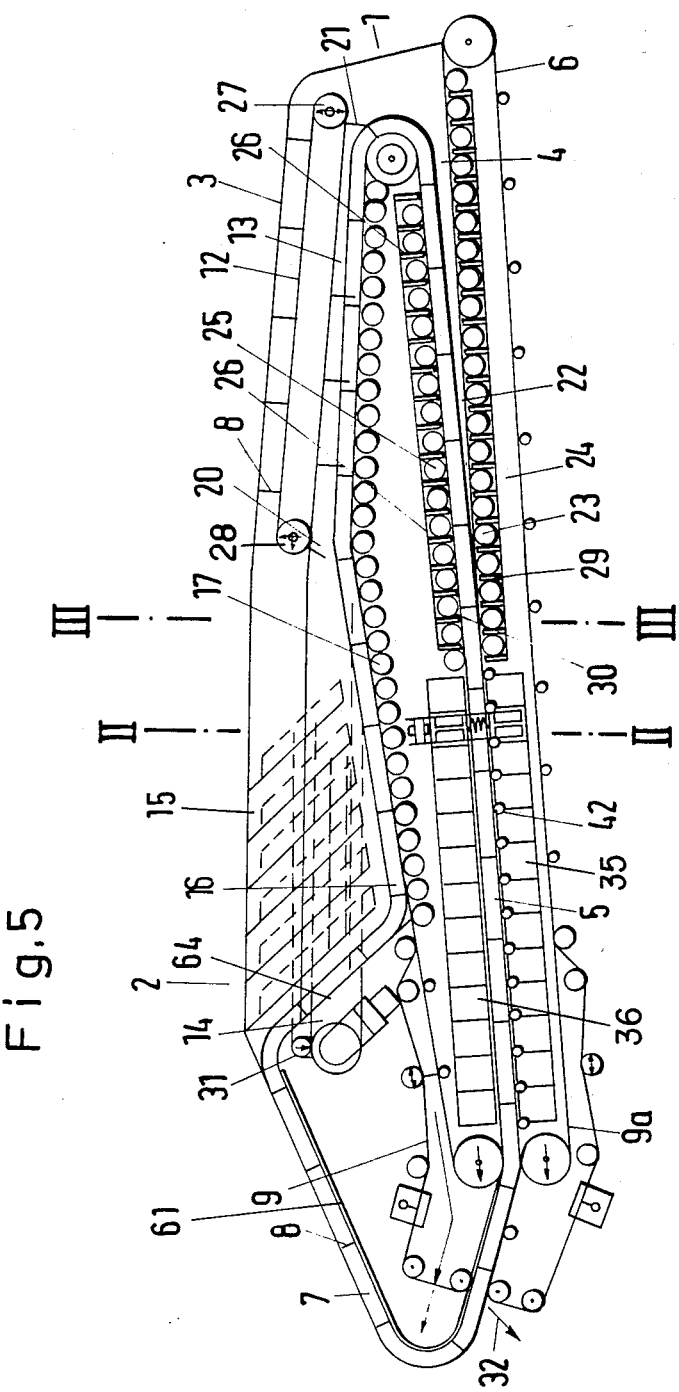
FIG. 5 is a diagrammatic longitudinal vertical sectional view showing a first embodiment of the dewatering apparatus in accordance with the invention.

The dewatering apparatus in accordance with the invention which is diagrammatically illustrated in FIG. 5 and generally designated 1 comprises a pre-dewatering stage 2, a first medium-pressure stage 3 for applying a low pressure, a medium-pressure stage 4 for applying a higher pressure, and finally a high-pressure stage 5.

The embodiment which is highly diagrammatically shown in FIG. 5 comprises two filter belts 6 and 7. The lower filter belt 6 revolves in a counterclockwise sense in the medium-pressure stage 4 for applying a higher pressure and in the high-pressure stage 5. The upper filter belt 7 revolves in a clockwise sense through all stages.

The upper filter web 7 has associated with it protruding transverse webs 8, which are regularly spaced apart and will be explained more in detail hereinafter.

In the embodiment shown in FIG. 5 the filter belts 6 and 7 are supported by co-revolving supporting belts 9, which are provided with filtrate channels (not shown), which are open on the side facing the filter belts 6 and 7.

It is also diagrammatically shown in FIG. 5 that two revolving seals 10, 11 are provided for laterally sealing the sludge chamber volume that is defined by and between the filter belts.

The first medium-pressure stage 3 for applying a low pressure contains another revolving belt 12, which is provided with flights consisting of protruding transverse webs. The flight 12 revolves in a clockwise sense and together with the filter belt 7 defines a first wedge-shaped pressure chamber 13.

The pre-dewatering stage 2 which is diagrammatically shown in FIG. 5 comprises as essential components a mixing and reaction chamber 14 and a pre-dewatering chamber 15, which has a large volume and constitutes a buffer between the means for a continuous feeding of the sludge on the pre-dewatering side and the means for effecting a discontinuous discharge at the outlet of the high-pressure stage. The bottom 16 of the pre-dewatering chamber 15 is constituted by the revolving filter belt 7, which is provided with the protruding transverse webs 8 and is supported by the supporting belt 9. The bottom 16 of the pre-dewatering chamber is gently upwardly inclined in the direction of conveyance because the elevations of rollers 17 supporting the supporting belt increase as far as to the entrance to the first medium-pressure stage 2 for applying a low pressure.

It is shown that the pre-dewatering chamber 15 contains additional filter surfaces 18 separating the filtrate from the solids of the sludge. In the preferred embodiment said additional filter surfaces are constituted by steeply inclined slotted sieves 19, which are disposed in the pre-dewatering chamber 15.

That highly effective pre-dewatering results in a considerable decrease of the volume so that only between one-half of the volume and one-third, as a minimum, is required to be forwarded from the entrance 20 of the first medium-pressure stage 3.

In the medium-pressure stage the upper flight belt 12 provided with protruding transverse webs 8 runs up on the filter belt 7 as shown so that the two mutually opposite protruding transverse webs of the two belts overlap and the sludge is conveyed in batches through the wedge-shaped pressure space 13. At the exit 21 of the first medium-pressure belt 6, the first medium-pressure belt 6 is supported by the associated supporting belt 9a. The medium-pressure stage 4 for applying a higher pressure has also a wedge-shaped pressure space 22, which is defined by and between the filter belt 6 and the here overlying filter belt 7 with the associated supporting belt so that in the medium-pressure stage 4 a pressure-applying belt is constituted by the filter belt 7 and the associated supporting belt 9.

In the medium-pressure stage 4 the filter belt 6 and the associated supporting belt 9 are supported by a multiplicity of pressure-applying rollers 23, which are juxtaposed and closely spaced apart and are movably mounted in a common mounting frame 24. The filter belt 7 is disposed above the wedge-shaped space 22 and provided with protruding transverse webs 8 and in the medium-pressure stage 4 constitutes the pressure-applying belt and is also supported by a supporting belt 9. The filter belt 7 moves also over a multiplicity of overlying pressure-applying rollers 25, which are mounted in a common mounting frame 26.

As will be explained more in detail hereinafter with reference to the more detailed sectional views shown in FIGS. 6 and 7, the pressure which is applied to the sludge volume in the wedge-shaped space 22 by the pressure-applying rollers 25 via the supporting belts 9 and the two filter belts 6 and 7 can be varied because at least one of the mounting frames 24 or 26 is pivoted at one end and pressure generators are provided to force the pivoted frame toward the other frame.

A similar design may be adopted for the medium-pressure stage 3 for applying a lower pressure. In that case the means for mounting the two reversing pulleys 27 and 28 may be pivoted and adapted to be subjected to pressure.

As is apparent from FIG. 5, supporting bars 29 and 30 which preferably consist of or are coated with a low-friction material are provided in the two mounting frames 24, 26 between the pressure-applying rollers 23, 25 and are parallel to the latter.

The supporting bars 29, 30 are so arranged relative to the pressure-applying rollers 23, 25 that a lower supporting bar 29 registers with an upper pressure-applying roller 25 and an upper supporting bar 30 registers with a lower pressure-applying roller 23. Owing to that design the pressure which is applied when the belts are stopped, as explained hereinbefore, will result in the formation of a highly uniform pressure-applying surfaces on both sides of the sludge volume. It may be desirable to spring-cushion the supporting bars.

Figure 6:
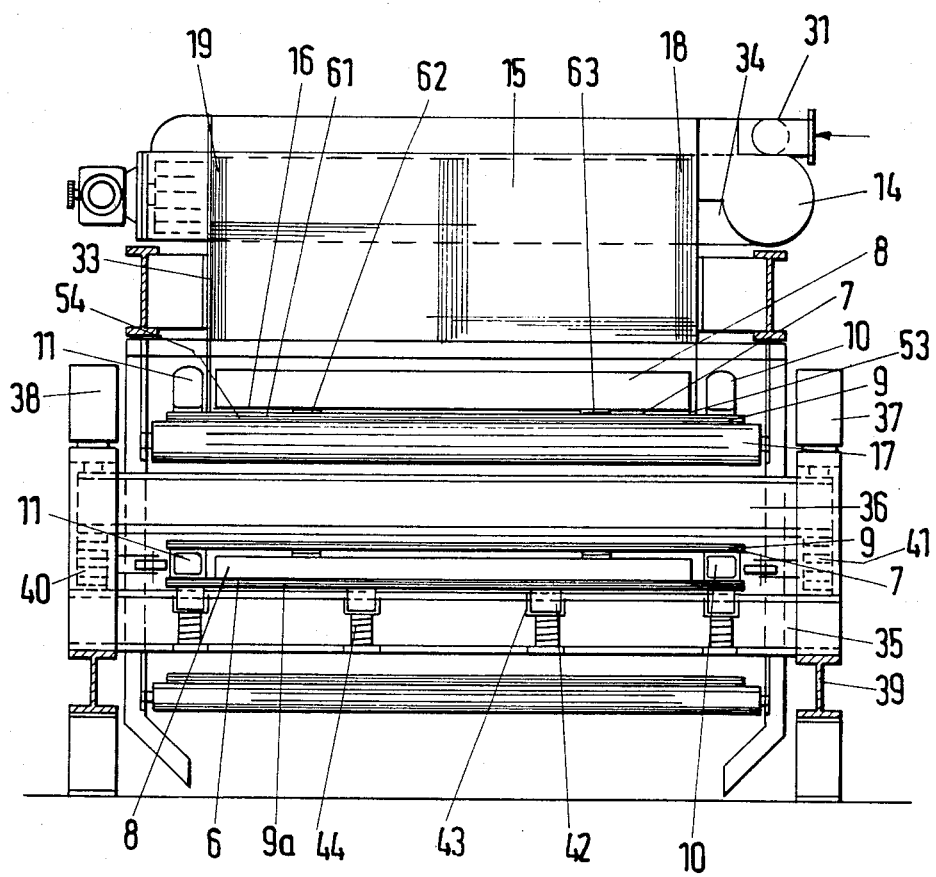
FIG. 6 shows on a somewhat larger scale a sectional view taken approximately on line II—II in FIG. 5.
Figure 7:
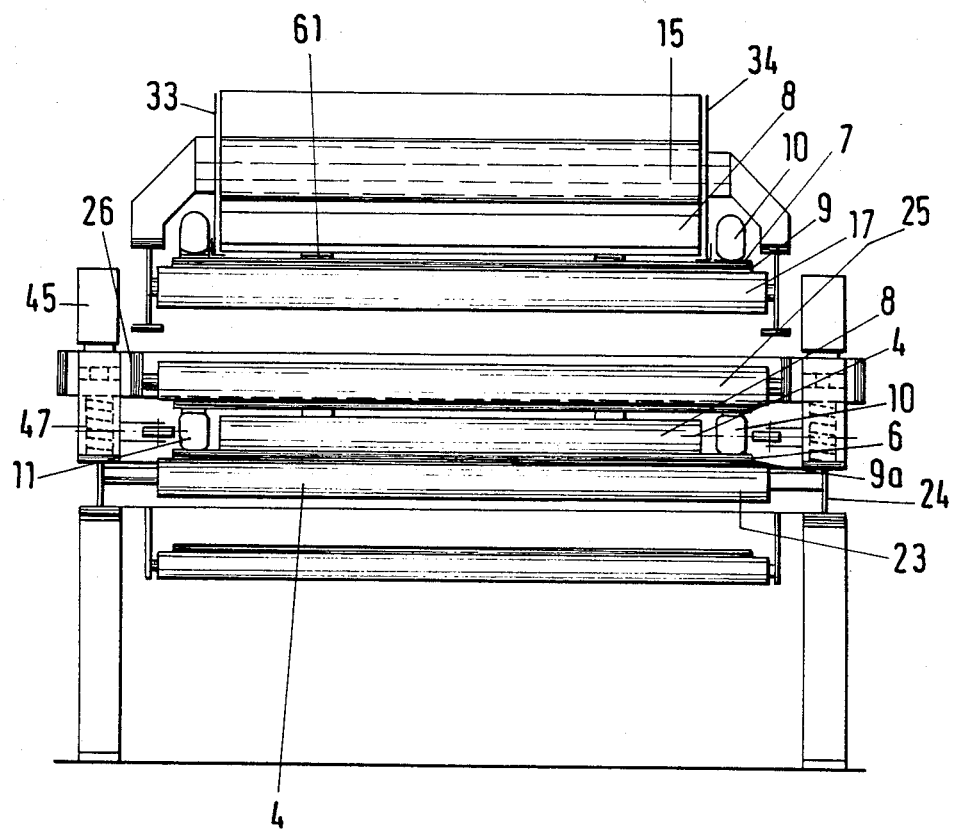
FIG. 7 shows also on a larger scale a section view taken approximately on line III—III in FIG. 5.

Before a discussion of further details which are apparent from the sectional views of FIGS. 6 and 7, the mode of operation will now briefly be described.

It is assumed that the apparatus is intermittently operated, as mentioned above, and that the cycle time depends on the residence time of the sludge volume in the high-pressure stage 5. The sludge to be dewatered is continuously fed to the pre-dewatering chamber 15 through a mixing and reaction unit that is generally designated 31. The sludge is also continuously dewatered through the bottom consisting of the filter belt 7 and through the slotted sieves 19. The dewatering is assisted by the hydrostatic pressure which prevails in the interior of the pre-dewatering chamber 15. If it is assumed that the filter belts, pressure-applying belts and flight belts are initially stopped and are subsequently advanced during the next opening stroke of the high-pressure stage 5 to an extent which corresponds to the width of the high-pressure stage, that portion of the filter belt 7 which previously constituted the bottom 16 of the pre-dewatering chamber 15 will be conveyed toward the first medium-pressure stage for applying a lower pressure during the next opening stroke of the high-pressure stage 5. In that medium-pressure stage for applying a lower pressure the sludge is dewatered further under a medium pressure in the wedge-shaped space 22 by the flight belt 12, which is running up from above. At the same time, the filter belts 6 and 7 are moved into the wedge-shaped space 22 of the medium-pressure stage 4 for applying a higher pressure so that that volume of the sludge which was previously contained in the wedge-shaped space is conveyed into the wedge-shaped space 22 of the medium-pressure shape 4 for applying a higher pressure and the previously dewatered volume contained in that stage is moved into the high-pressure stage.

When the belts have been advanced by a distance which corresponds to the width of the high-pressure stage 5, the apparatus is stopped again and is now ready for the pressurizing phase whereas the continuous feeding of the sludge into the pre-dewatering chamber 15 is continued.

During the pressurizing phase the belts are stopped and the sludge chamber volume in the high-pressure stage 5 is subjected to the action of the pairs of pressure plates, which will be explained in detail hereinafter.

As the belts are stopped in any case at that time, the pressure generators provided in the illustrated embodiment are used at the same time to apply a pressure to the upper mounting frame 26 in the medium-pressure stage 4 so that the sludge chamber volume contained in the wedge-shaped space 22 is also subjected to an intensified dewatering under pressure.

An additional pressure may optionally be applied at the same time in the medium-pressure stage 3 by the flight belt 12.

During the pressurizing phase the lateral seals 10, 11 will prevent a lateral escape of the sludge which is being dewatered under pressure.

Behind the high-pressure stage 5 the dewatered sludge cake is thrown off in the direction of the arrow 32. Thereafter the belts are cleaned by the scraping and cleaning means which are diagrammatically shown in FIG. 5. During the discharge, part of the sludge that is to be dewatered is also advanced between the several stages 2, 3, 4, and 5 in preparation for the next pressurizing phase.

Details of the pre-dewatering chamber 15 and of the underlying high-pressure stage 5 are apparent from the sectional view in FIG. 6. It is seen that in the pre-dewatering stage 2 the revolving seals 10, 11 extend outside the side walls 33, 34 of the pre-dewatering chamber 15.

From the sectional view it is also apparent that the protruding transverse webs 8 are secured to a separately revolving web belt 61, which revolves in unison with the seals 10, 11, but adjacent to the pre-dewatering stage extends inside the side walls 33, 34 of the pre-dewatering chamber 15. The web belt 61 consists of two revolving rubber strips 62, 63, to which the protruding transverse webs are secured. The same design has been adopted in the embodiments shown in FIGS. 10 and 11.

In the elevation shown in FIG. 1 it is seen that the web belt 61 enters the pre-dewatering chamber 15 along a rear wall 64, separately from the filter belt 7.

In the high-pressure stage 5 the portions of the sludge volume disposed between the protruding transverse webs 8 are contained between the filter belt 7, the supporting belt 9 disposed behind the filter belt 7, the lower filter belt 6 and the associated supporting belt 9a. A lateral boundary is constituted by the revolving seals 10, 11, which are compressed between the filter belts 6 and 7 in that region.

The high-pressure stage 5 consists of a number of stationary pairs of pressure-applying plates. Each of said pairs consist of a fixedly mounted lower pressure-applying plate 35 and an upper pressure-applying plate 36, which is vertically movable. A pair of hydraulic cylinders 37, 38 are associated with each pair of pressure-applying plates 35 and 36 and are operable to urge the upper pressure-applying plate 36 toward the stationary lower pressure-applying plate 35. The lower pressure-applying plate 35 is fixedly mounted in a frame 39.

Each pair of pressure-applying plates 35 and 36 have associated with them a pair of springs 40, 41, which act between the pressure-applying plates 35 and 36 and serve to open the high-pressure stage 5 when the hydraulic cylinders 37, 38 have been relieved. When the pressure stroke has been terminated the springs 40, 41 lift the upper pressure-applying plate 36 from the lower pressure-applying plate 35. The pair of springs 40, 41 ensure that the upper pressure-applying plates 36 will automatically be lifted when the pressing operation has been terminated so that the belt means can then be advanced. The lower belt means consisting of the filter belt 6 and the supporting belt 9a are guided by pressure-applying rollers 42, four of which are provided in each lower pressure-applying plate 35 and extend through corresponding openings 43 in the pressure-applying plate 35 and protrude above its surface. The pressure-applying rollers 42 are movably mounted on suitable spring elements 44, which are also disposed in the openings 43. The arrangement ensures that the belt means 6, 7 will be slightly raised when the high-pressure stage has been relieved so that the friction on the lower pressure-applying plates 35 will be reduced during the advance of the belt.

The outermost pressure-applying rollers 42 are preferably disposed exactly at the location of the co-revolving seals 10, 11 between the two belt means so that the additional pressure applied by the pressure-applying rollers 42 will promote the lateral seal even at the beginning of the pressure cycle.

Details of the particularly preferred embodiment of the medium-pressure stage 4 are apparent from the sectional view in FIG. 7. Attention is directed to the foregoing detailed description.

The arrangement in the medium-pressure stage 4 is similar to that in the high-pressure stage 5 in that a higher pressure can be applied to the sludge volume contained in the wedge-shaped space 22 when the belts are stopped. For that purpose, hydraulic cylinders 45 are provided on both sides of the mutually opposite pairs of pressure-applying rollers 23. In the illustrative embodiment, the lower pressure-applying rollers are combined in a stationary mounting frame 24, which rests on an underframe 46. The upper pressure-applying rollers 25 are movably mounted in the movable mounting frame 46, which is vertically movable by the hydraulic cylinder 45. It will be understood that in an alternative arrangement each pressure-applying roller 25 may be individually movable by a hydraulic cylinder 45.

Compression springs 47 are laterally held under stress between the mounting frames 24 and 26 and cause the upper mounting frame 26 and the upper pressure-applying rollers 25 to be automatically raised when the pressing operation has been terminated so that a higher pressure will not be applied during the advance of the belt means.

Figure 8:
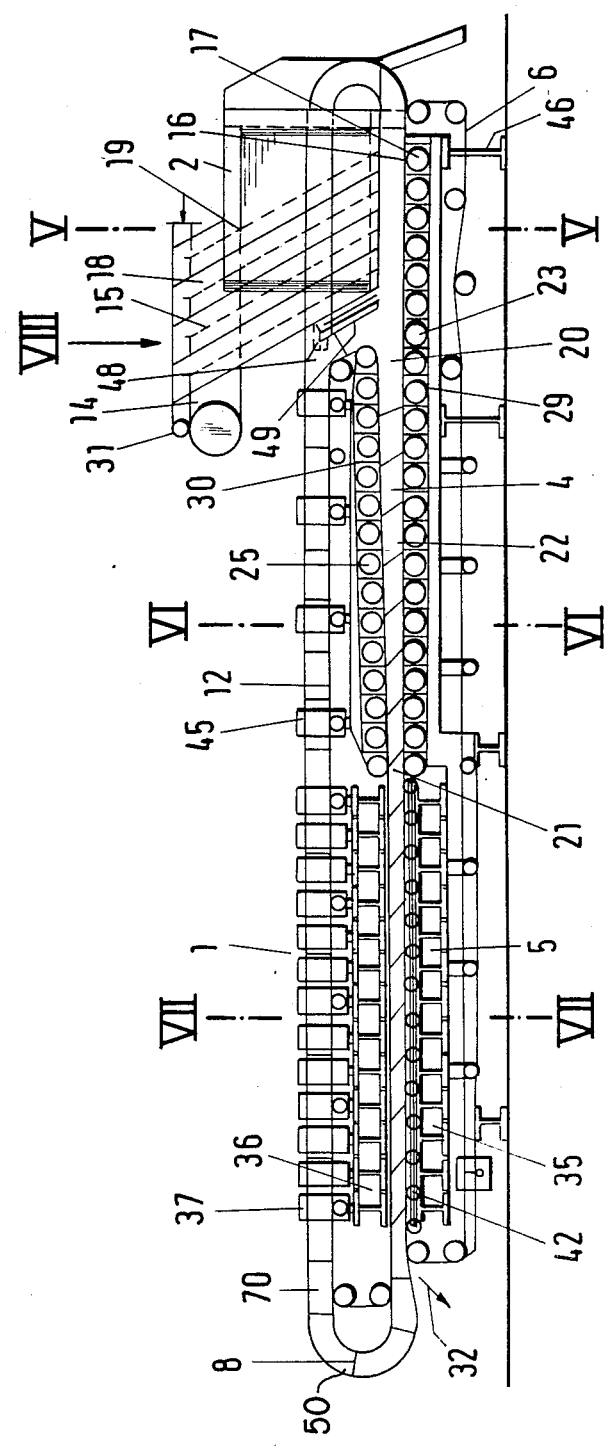
FIG. 8 is an elevation which is similar to FIG. 5 and shows a particularly preferred embodiment of the dewatering apparatus in accordance with the invention.

FIG. 8 shows a particularly preferred embodiment of the invention in an elevation which is similar to FIG. 5. Like reference characters are used for like parts and for sections which have the same function. The embodiment of FIG. 8 is much simpler than the embodiment of FIG. 5 and has only a single medium-pressure stage for applying a higher pressure.

It is apparent that the medium-pressure stage 4 closely succeeds the pre-dewatering stage 2. The entire apparatus comprises only a filter belt, a pressure-applying belt 70 provided with protruding transverse webs 8, and two revolving seals.

At the transition from the pre-dewatering stage 2 to the medium-pressure stage 4 the pressure-applying belt 70 that is provided with flights consisting of a protruding transverse webs 8 first extends through a pressure lock chamber, which is generally designated 48 and prevents the sludge disposed in the pre-dewatering chamber 15 from moving opposite to the direction of conveyance of the flight belt 12 under the action of the hydrostatic pressure prevailing in the chamber. In the illustrative embodiment the lock chamber 48 is defined by a surface portion 49, which is opposite to and spaced from the flight belt 12 and which is always in contact with the free top edges 50 of the protruding transverse webs 8. As a result, the pressure lock chamber 48 is always sealed by at least one chamber disposed between two protruding transverse webs during a movement of the flight belt 12 in a clockwise sense, as is apparent from FIG. 8.

Figure 9:
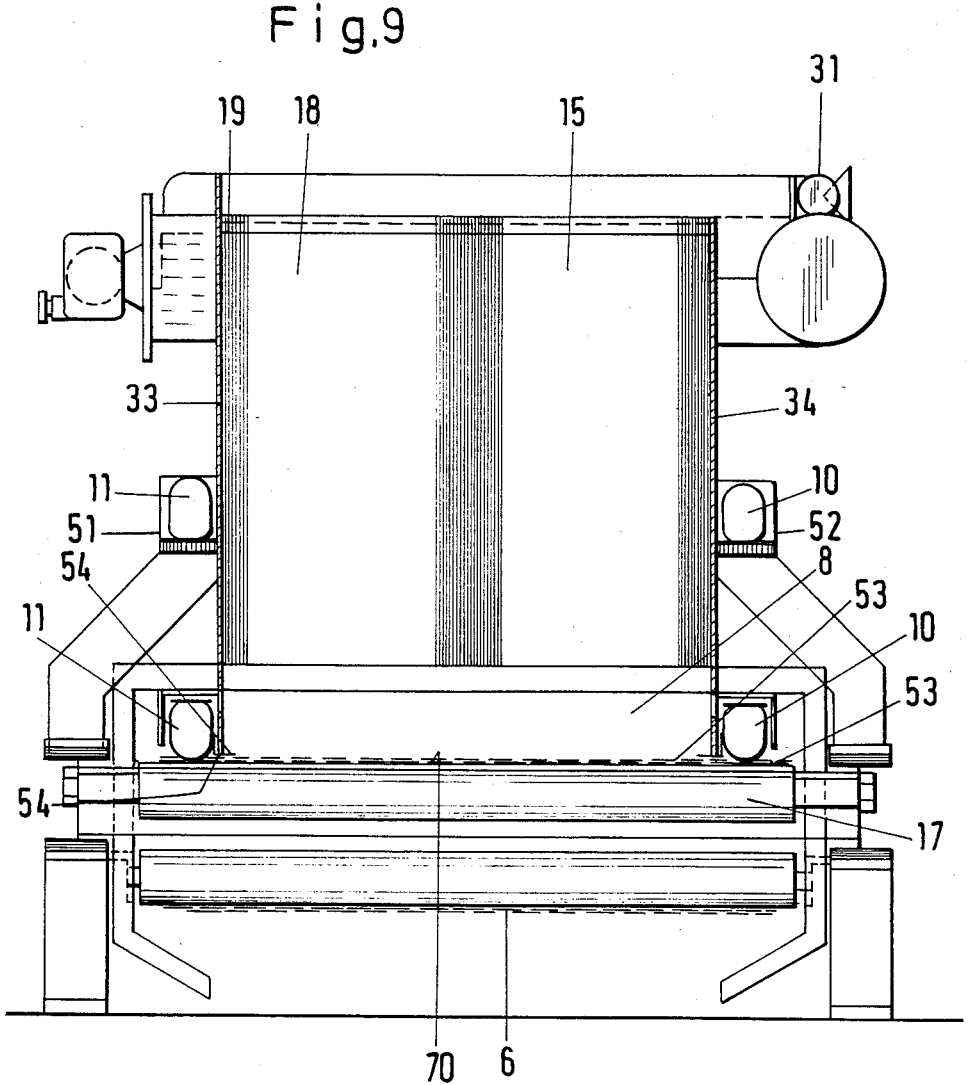
FIG. 9 shows on a larger scale a vertical longitudinal sectional view taken approximately along the line V—V in FIG. 8.

From the sectional view in FIG. 9 it is apparent that the bottom 16 of the pre-dewatering chamber 15 is constituted only by the pressure-applying belt 70, which is supported on the rollers 17 and provided with protruding transverse webs 8. Owing to the special design of the high-pressure stage 5, which will be explained more in detail hereinafter, there is no need for supporting belts. It is also apparent that in the embodiment shown in FIGS. 8 to 12 the co-revolving seals 10, 11 extend outside the walls 33, 34 adjacent to the pre-dewatering chamber 15. In accordance with FIG. 9 a special feature resides in that the upper course of each of the revolving seals 10, 11 extends in a filtrate discharge trough 51 or 52 and virtually floats on the filtrate which is being conveyed in said trough. The filtrate discharge troughs 51, 52, are secured to the side walls 33, 34 of the pre-dewatering chamber 15.

Adjacent to the pre-dewatering chamber 15 the side walls 33, 34 are sealed from the pressure-applying belt 70 by seals 53, 54, which contact the pressure applying belt 70 at the lower edges of the walls 33, 34.

Figure 10:
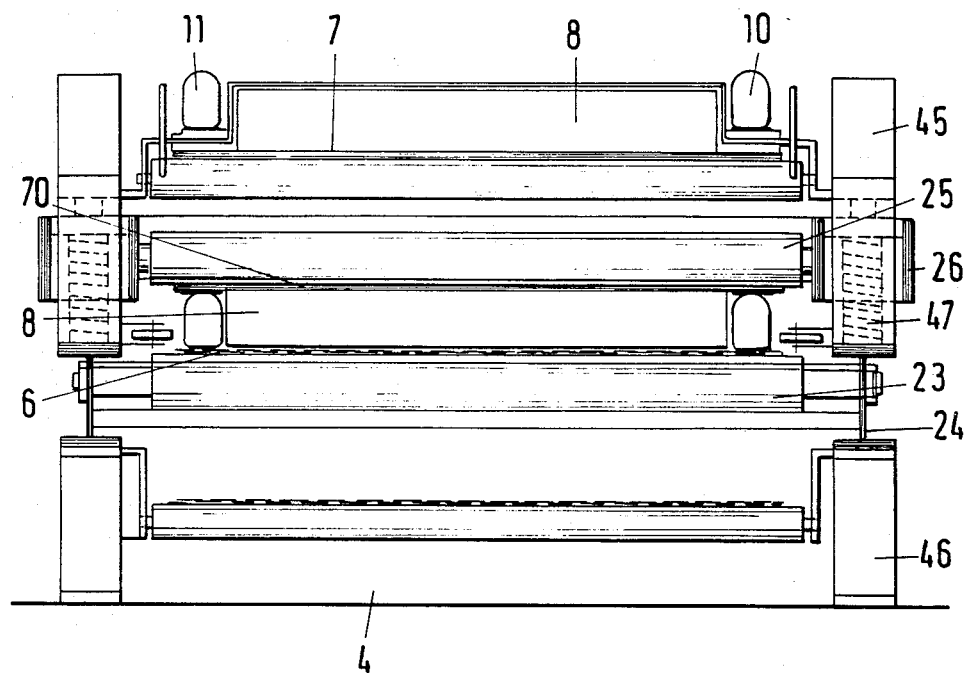
FIG. 10 is an enlarged vertical longitudinal sectional view taken approximately on line VI—VI in FIG. 8.

FIG. 10 is a sectional view taken on line VI—VI of FIG. 8 in the medium-pressure stage 4. It is apparent that the design is similar to that shown in FIG. 7 and like reference characters have been used so that attention may be directed to the above description. But a difference resides in that the flight belt 12 provided with protruding transverse webs 8 is used in the medium-pressure stage 4 as a pressure-applying belt 70. The protruding transverse webs 8 are pivoted to the flight belt 12 or are flexible.

Figure 11:
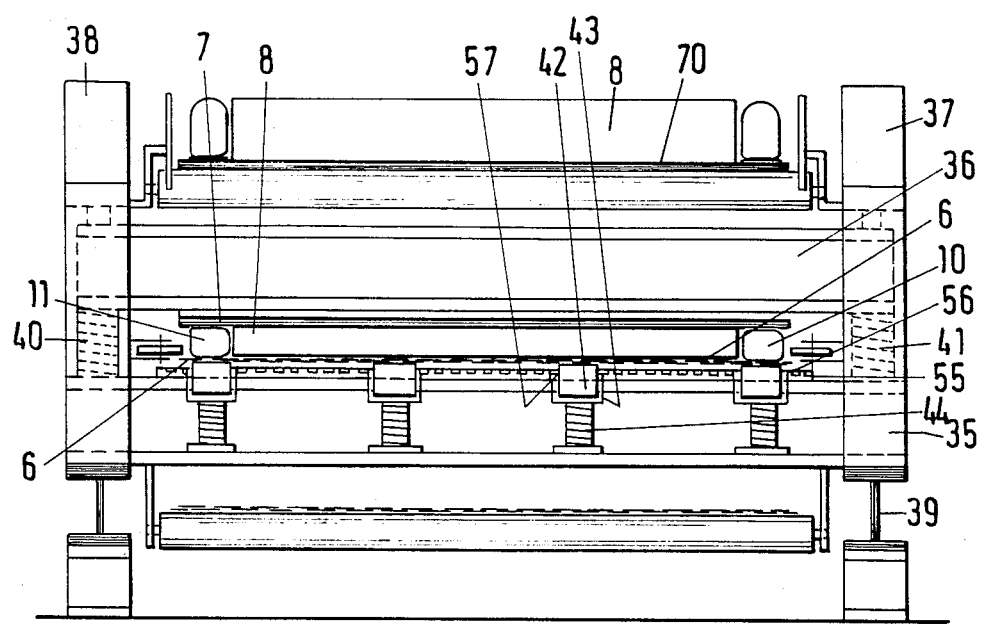
FIG. 11 is an enlarged vertical longitudinal sectional view taken approximately on line VII—VII in FIG. 8.

FIG. 11 is a sectional view taken on line VII—VII in FIG. 8 in the plane of the high-pressure stage 5.

It is apparent that in the high-pressure stage 5 of the preferred embodiment shown in FIGS. 8 to 12 the supporting strips are replaced by a plate 55, which is provided on the stationary lower pressure-applying plates 35 and supports the filter belt 6 and is formed with opentopped filtrate channels 56.

It is apparent that in that case the pressure-applying rollers 42 protrude not only through the openings 43 in the pressure-applying plates 35 but also through openings 57 in the plate 55. When the high-pressure stage 5 has been relieved, the spring elements 44 cause the pressure-applying rollers 42 to directly raise the filter belt 6 so that the sludge cake can be discharged with low friction. Regarding further details of FIG. 11, attention is directed to the foregoing description, particularly with reference to FIG. 6.

Figure 12:
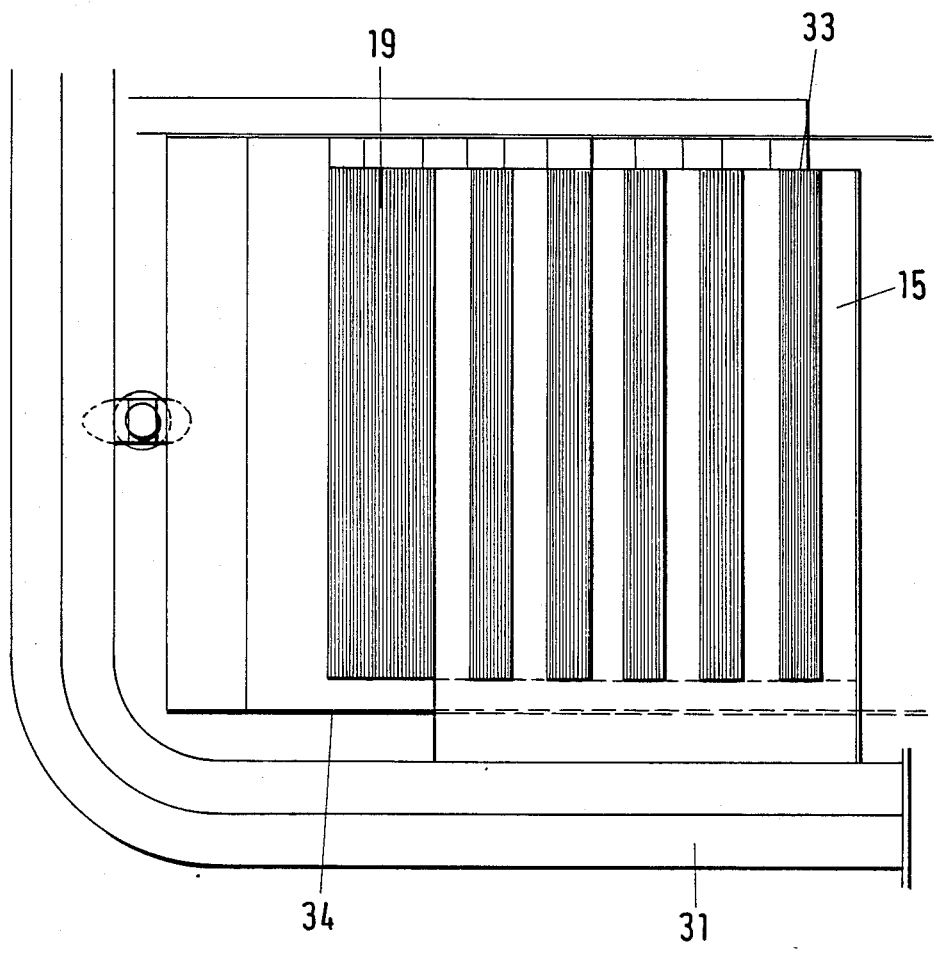
FIG. 12 is an enlarged top plan view taken in the direction of the arrow VIII in FIG. 8 and showing the region of the pre-dewatering chamber.

FIG. 12 is a top plan view taken in the direction of the arrow VIII—VIII in FIG. 8. Only a part of the apparatus, namely, the pre-dewatering stage, is shown. The arrangement of the slotted sieves 19 and of parts of the mixing and reaction unit 31 are apparent from FIG. 12.

Figure 13:
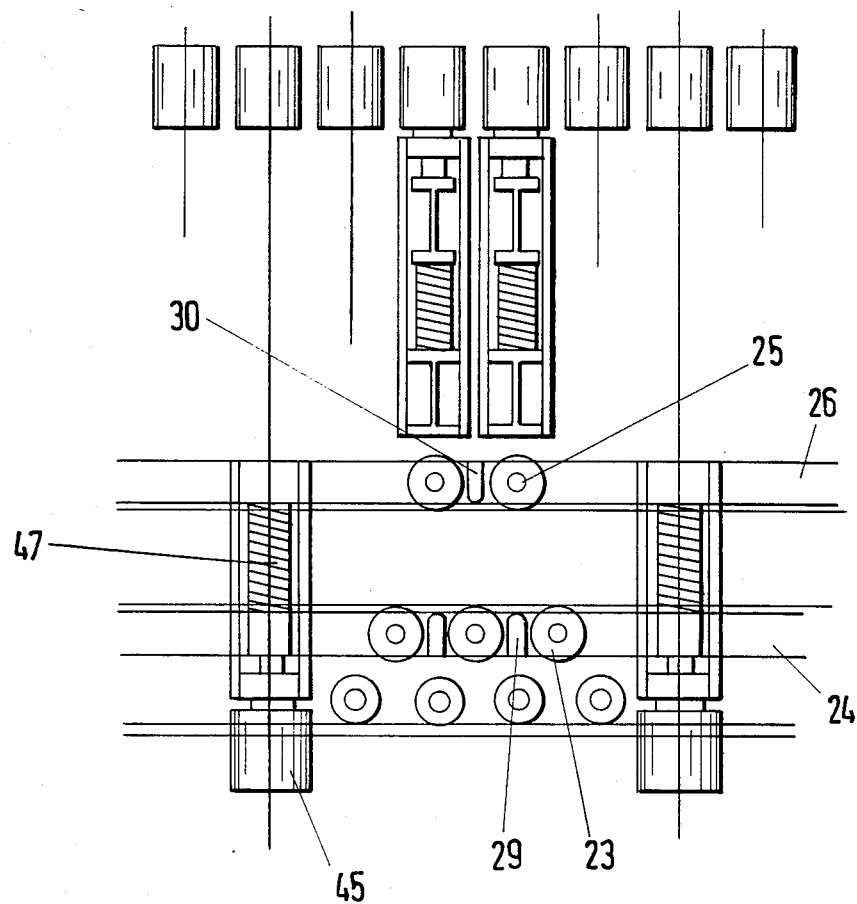
FIG. 13 shows a portion of the medium-pressure stage as a detail on a still larger scale.

FIG. 13 is a diagrammatic side elevation showing details of the medium-pressure stage 4. The association of the spring elements 47, of the hydraulic cylinders 45 and of the pressure-applying rollers 23, 25 as well as the supporting bars 29, 30 is shown in more detail.

Figure 14:
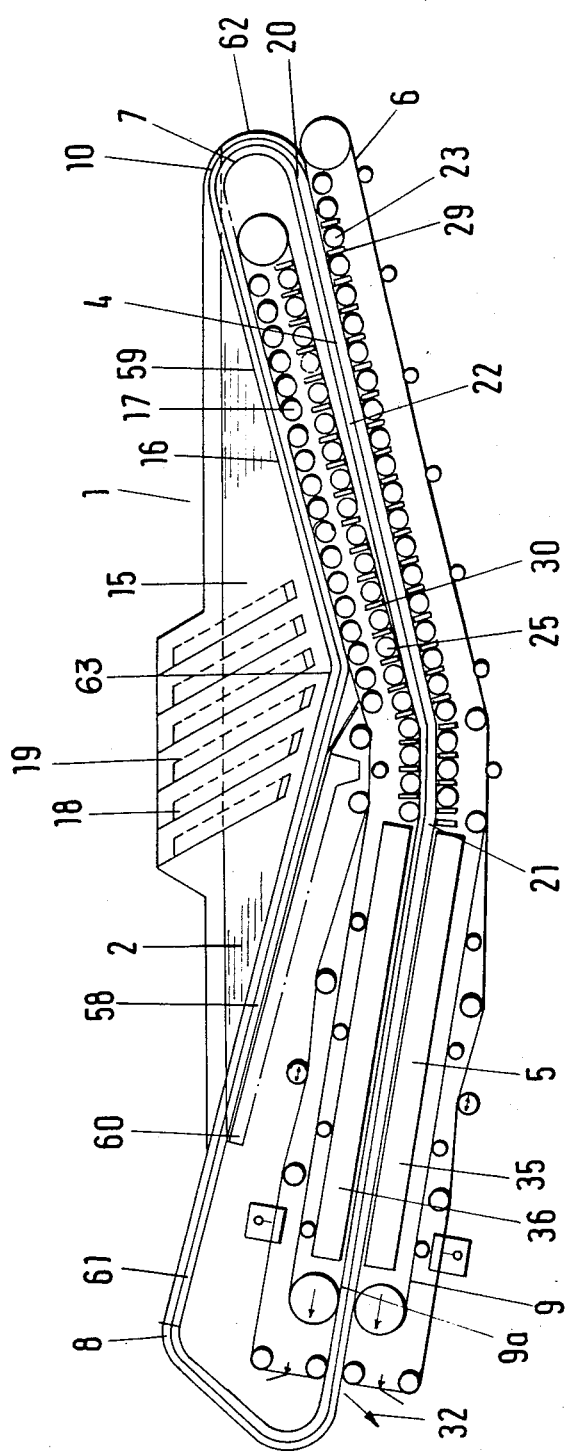

FIG. 14 is a diagrammatic vertical longitudinal sectional view which corresponds to FIGS. 5 and 8 and illustrates a further embodiment of the apparatus 1 in accordance with the invention. Like reference characters have again been used for like parts and for parts having the same function.

In the embodiment shown in FIG. 14 the bottom 16 of the pre-dewatering chamber 15 is divided into two sections 58 and 59. A dewatering box 60 having a large area is disposed under the section 58, which is the first in the direction of conveyance. The dewatering box 60 supports the filter belt 7 in that section. The first section 58 of the bottom 16 slopes down to a lowermost point 63 of the pre-dewatering chamber 15. That lowermost point is disposed approximately below the additional filter surfaces 18 which are provided and consist of slotted sieves 19. In the bottom section 59 which succeeds in the direction of conveyance the filter belt 7 is again supported on the rollers 17. The section 59 slopes upwardly to a point of inflection 62, which is succeeded by the entrance 20 to the medium-pressure stage 4. Attention to the foregoing description can be directed as regards further details.

Figure 15:
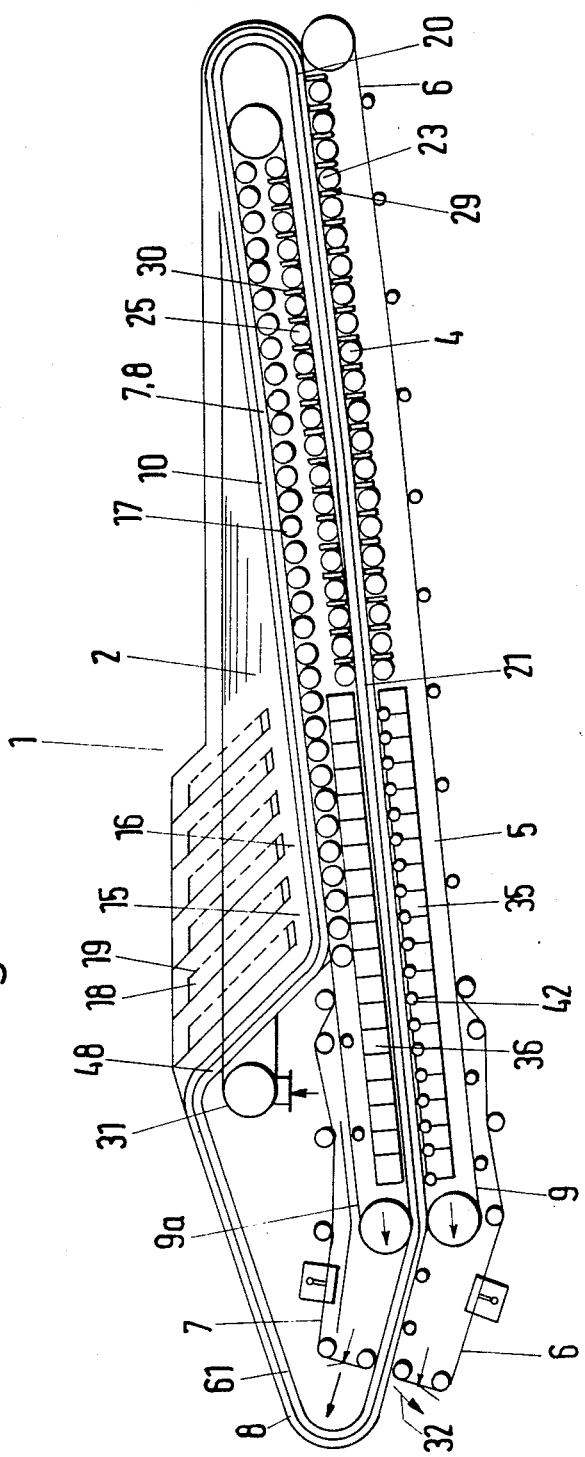

FIG. 15 shows a further modification of the apparatus 1 in accordance with the invention in a view that corresponds to FIG. 14. Because like reference characters have been used, FIG. 15 can be understood without a need for further explanation.

It is emphasized that the hydraulic cylinders 37, 38 and 45 have been omitted in FIGS. 14 and 15 for the sake of clarity.

Figure 16:
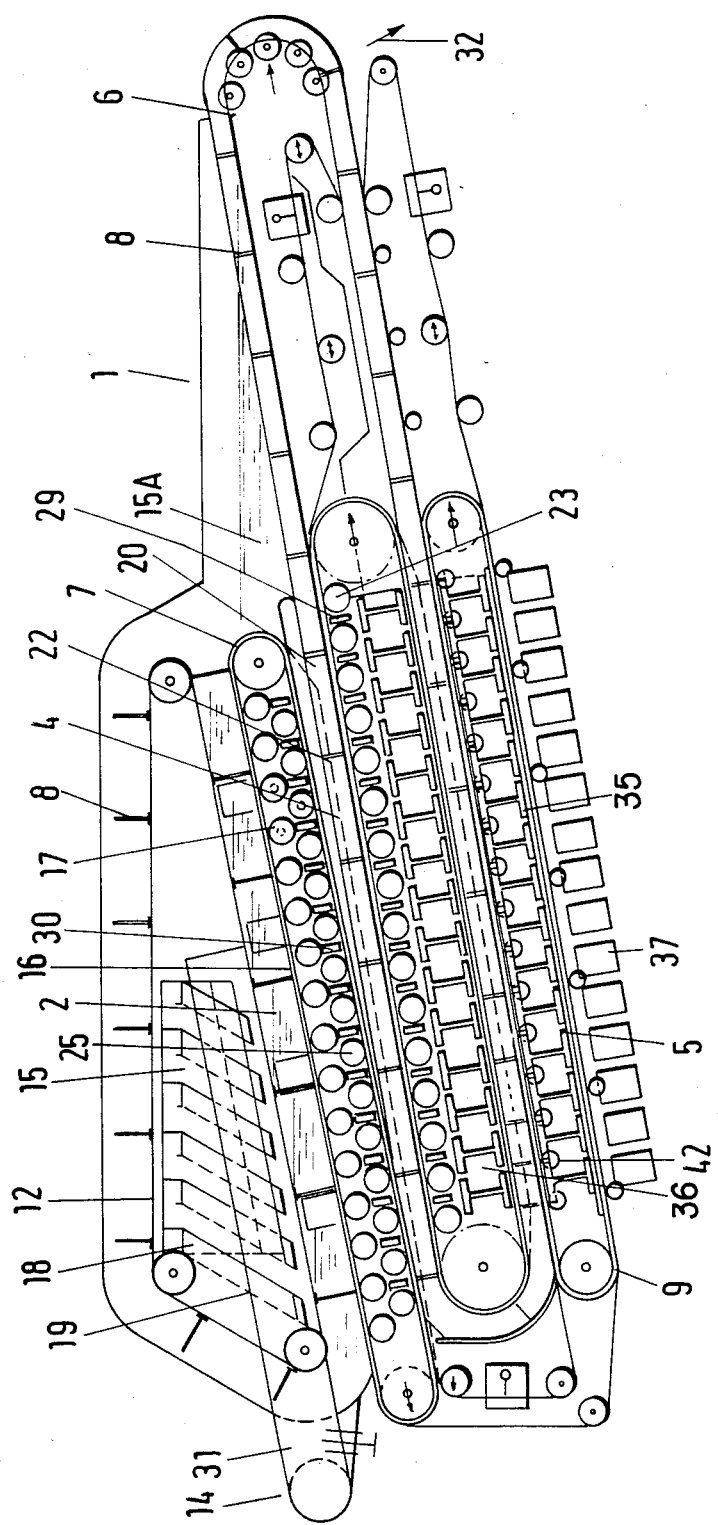

FIG. 16 is a view that is similar to FIGS. 14 and 15 and illustrates a further modification of the apparatus 1 in accordance with the invention. The essential difference of that embodiment resides in that the pre-dewatering chamber 15 is divided into two sections 15, 15A. The second section 15A directly precedes the entrance to the medium-pressure stage 4. In other design features the embodiment of FIG. 16 is similar to the embodiment of FIG. 5 so that attention may be directed to the description given with reference to FIG. 5.

FIG. 17 illustrates a particularly simple embodiment of the apparatus 1 in accordance with the invention. In addition to the seals 10, 11, only a filter belt 6 having no protruding transverse webs and a pressure-applying belt 70 provided with protruding transverse webs 8 have been used. In that embodiment the high-pressure stage 5 is provided with the plate 55 that is formed with filtrate channels 56, as is shown in FIG. 8. For this reason attention may be directed to the description of the embodiment of FIG. 9.

It is common to all embodiments described with reference to FIGS. 5 to 17 that in the pre-dewatering stage the feeding of the sludge, the transport of the sludge and the dewatering are performed continuously. On the other hand, the transport and the dewatering of the sludge in the medium-pressure stage and in the high-pressure dewatering stage are intermittently performed. In the pre-dewatering stage, the pre-dewatering chamber 15 having a large volume serves as a buffer when the filter belts are stopped during the dewatering in the high-pressure dewatering stage. As the filter belts are stopped during that time in any case, that time is utilized in the described embodiments for an increase of the pressure also in the medium-pressure stage.

As in the medium-pressure stage and the high-pressure stage all pressure-applying elements such as pressure-applying plates and hydraulic cylinders are stationary in that they do not move in unison with the filter belts, the filter belt will advance only with a timing corresponding to the adjustable dewatering time and in increments which are equal to the length of the high-pressure dewatering stage. When the hydraulic cylinders have been relieved, the dewatered sludge in the high-pressure dewatering stage is discharged from the machine and thrown off as a sludge cake. At the same time, the high-pressure dewatering stage is refilled with sludge from the medium-pressure stage and the latter is filled with sludge from the pre-dewatering stage. The sludge level in the pre-dewatering chamber rises when the belts are stopped and decreases during the filling of both stages.

All features and advantages of the invention which are apparent from the description, the claims and the drawings, inclusive of structural details and three-dimensional arrangements, may be essential for the invention in themselves and in any desired combination.

While the invention has been particularly shown and described in reference to preferred embodiments thereof, it will be understood by those skilled in the art that changes in form and details may be made therein without departing from the spirit and scope of the invention.

I claim:

1. Apparatus for dewatering sludge, comprising: a sludge feeding means for continuously feeding of the sludge to the apparatus, a sludge transfer means having a sludge chamber volume and pressure-applying plates for a discontinuous, intermittent transfer of the sludge for discharging the sludge from the dewatering apparatus and for applying high pressure to the sludge for dewatering the sludge, and a buffer means located between the sludge feeding means and the sludge transfer means, wherein the buffer means comprises a stationary container having a pre-dewatering stage which is continuously fed with the sludge to be dewatered and having one end of the container communicating with the sludge chamber volume, and wherein the buffer means is for substantially reducing the volume of the sludge prior to leaving the pre-dewatering stage.

2. Apparatus according to claim 1, wherein the buffer comprises a dewatering basket, the lower end of which communicates with the sludge chamber volume.

3. Apparatus according to claim 2, comprising a filter belt, which defines one side of the sludge chamber volume and is substantially horizontal adjacent to the point where the sludge is transferred, characterized in that the filter basket is disposed directly above the filter belt.

4. Apparatus according to claim 2 or 3, further comprising: a mixing and reaction chamber having a sludge and flocculant inlet for a continuous feeding of the sludge and flocculant to the mixing and reaction chamber means for continuously feeding sludge from the mixing and reaction chamber to the dewatering basket, wherein the dewatering basket comprises at least one sieve basket having a vertical cylinder axis and serving for hydrostatic dewatering of the sludge and the filtrate flows in the dewatering basket through the at least one sieve basket in a radial direction, and means for collecting and discharging the filtrate.

5. Apparatus according to claim 4, wherein the mixing and reaction chamber is defined by a vertical U-shaped tubular body, the sludge and flocculant inlet is disposed at the upper end portion of one leg of the tubular body, and the upper end portion of the other leg of the tubular body communicates with the means for a continuously feeding of the sludge to the dewatering basket.

6. Apparatus according to claim 5, wherein the upper end portion of the other leg is arranged at such an elevation relative to the dewatering basket that the sludge leaving the upper end portion of the other leg overflows freely to the upper top end of the dewatering basket.

7. Apparatus according to claim 4, wherein mixing means consisting essentially of a stirring wheel are provided in the mixing and reaction chamber adjacent to the inlet for sludge and flocculant.

8. Apparatus according to claim 4, wherein two concentric sieve baskets are provided and the sludge is fed to the annulus disposed between the two sieve baskets.

9. Apparatus according to claim 4, wherein the dewatering basket comprises means for cleaning the openings of the at least one sieve basket.

10. Apparatus according to claim 9, wherein the cleaning means consist of a rotating scraper, which sweeps over a surface of the at least one sieve basket.

11. Apparatus according to claim 1, characterized in that means for controlling the rate at which the pre-dewatered sludge is transferred to the sludge chamber volume are provided between the lower end of the dewatering basket and the sludge chamber volume.

12. Apparatus according to claim 11, wherein said means for controlling comprises at least one of a controllable and automatically controllable flap valve.

13. Apparatus according to claim 12, wherein the sludge chamber volume is defined by and between a lower revolving filter belt and an upper revolving belt.

14. Apparatus according to claim 13, wherein the upper belt is a pressure-applying belt.

15. Apparatus according to claim 13 or 14, wherein the belts which define the sludge chamber volume extend through a high-pressure dewatering zone, which is straight and horizontal and is defined by at least one pair of mutually opposite, horizontal, stationary pressure-applying plates, the belts defining the sludge chamber volume extend between the plates of said pair, and the plates of said pair are adapted to be intermittently moved toward each other in order to apply the dewatering pressure.

16. Apparatus according to claim 15, wherein a plurality of juxtaposed pairs of pressure-applying plates are provided.

17. Apparatus according to claim 16, wherein lower pressure-applying plates of the plate pairs have hydraulic pressure generators operably engaged therewith and are rigidly mounted on the apparatus frame, upper pressure-applying plates of the plate pairs are moveable by the hydraulic pressure generators into engagement with the lower pressure-applying plates, or vice versa.

18. Apparatus according to claim 17, wherein the pressure-applying plates of each pair of pressure-applying plates are urged apart by means of compression springs to an open position, in which the belts which define the sludge chamber volume can advance between the pressure-applying plates.

19. Apparatus according to claim 18, wherein mutually opposite pairs of pressure-applying rollers for guiding the belts which defined the sludge chamber volume are arranged along the high-pressure dewatering zone.

20. Apparatus according to claim 19, wherein the pressure-applying rollers are spring-biased toward the sludge chamber volume.

21. Apparatus according to claim 15, wherein sealing rings revolving about vertical axes are disposed on both sides of and adjacent to the high-pressure dewatering zone and serve to laterally seal the sludge chamber volume.

22. Apparatus according to claim 15, wherein a wedge-shaped dewatering stage is provided between the pre-dewatering stage and the high-pressure dewatering stage and the sludge chamber volume tapers in the shape of a wedge in the direction of sludge transport in said wedge-shaped dewatering stage.

23. Apparatus according to claim 22, wherein the belts which define the sludge chamber volume are supported by revolving chain link belts or by roller sets adjacent to the wedge-shaped dewatering stage.

24. Apparatus according to claim 13, wherein the filter belts are supported by a supporting belt, which comprises dewatering structures, channels and openings.

25. Apparatus according to claim 13, further comprising:
the revolving lower belt extends along a straight, substantially horizontal line between end reversing pulleys,
the dewatering basket is disposed above one end of the lower belt,
the space between the lower end of a sludge space of the dewatering basket and the lower belt is sealed laterally and toward one end of the belt and is open in the direction of transport of the belt.

26. Apparatus according to claim 25, wherein the flap valve succeeds the pre-dewatering stage 27. Apparatus according to claim 26, wherein the upper revolving belt which faces the pre-dewatering stage comprises a deflecting roller which succeeds the flap valve and the upper belt is downwardly inclined from said deflecting roller as far as to another deflecting roller at the end of the sludge chamber volume so as to define the sludge chamber volume.

28. Apparatus according to claim 11, wherein said means for controlling comprises at least one of a controllable and automatically controllable sliding valve.

29. Apparatus according to claim 1, characterized in that the sludge chamber volume extends along a straight line between a dewatering basket and a sludge cake discharge station (B).

30. Apparatus according to claim 1, wherein the sludge to be dewatered flows through the pre-dewatering stage in a vertical direction and the sludge chamber volume extends horizontally in a succeeding pressure-applying stage.

31. Apparatus according to claim 1, wherein the buffer means consist of a large-volume pre-dewatering chamber, the bottom of which is constituted by a filter belt.

32. Apparatus according to claim 31, wherein additional filter surfaces are provided in the pre-dewatering chamber.

33. Apparatus according to claim 32, wherein the filter surfaces consist of slotted sieves disposed in the pre-dewatering chamber.

34. Apparatus according to one of claims 31 to 33, wherein the pre-dewatering chamber is succeeded in the direction of conveyance by a wedge-shaped medium-pressure stage, in which an upper pressure-applying belt runs up on the sludge that is being conveyed.

35. Apparatus according to claim 34, wherein the pressure-applying belt consists of a flight belt that is provided with protruding transverse webs which are secured to the belt.

36. Apparatus according to claim 35, wherein the protruding transverse webs are pivoted or flexible.

37. Apparatus according to claim 36, wherein the protruding transverse webs are secured to a separately revolving web belt.

38. Apparatus according to claim 37, wherein the web belt is constituted by two spaced apart, revolving rubber strips.

39. Apparatus according to claim 37, characterized in that the web belt revolves in unison with seals.

40. Apparatus according to claim 35, wherein the flight belt extends through a lock chamber as it enters the medium-pressure stage.

41. Apparatus according to claim 40, wherein the lock chamber is defined by a surface portion, which is opposite to and spaced from the flight belt, and said surface portion is in contact with free top edges of the protruding transverse webs.

42. Apparatus according to claim 34, wherein the filter belt and the pressure-applying belt are supported on a multiplicity of pressure-applying rollers in a medium-pressure stage.

43. Apparatus according to claim 42, wherein the pressure applied by the pressure-applying rollers is variable.

44. Apparatus according to claim 43, wherein the pressure-applying rollers are provided with respective common mounting frames, the mounting frames are pivoted at one end, and pressure generators are provided for imparting a pivotal movement to the mounting frames.

45. Apparatus according to claim 44, wherein supporting bars consisting of a low-friction material are provided between adjacent pressure-applying rollers.

46. Apparatus according to claim 45, wherein the supporting bars are so arranged relative to the pressure-applying rollers that each supporting bar is opposite to a pressure-applying roller.

47. Apparatus according to claim 46, wherein the supporting bars are spring-cushioned.

48. Apparatus according to claim 44, wherein the pressure generators consist of hydraulic cylinders.

49. Apparatus according to one of claims 31 to 33, characterized in that co-circulating transverse protruding webs are associated to the filter belt.

50. Apparatus according to one claims 31 to 33, wherein two medium-pressure stages are connected in series.

51. Apparatus according to claim 31, wherein the filter belt lies on a plate, which is provided in a high-pressure stage on a lower stationary pressure-applying plate, and said plate has open-topped filtrate channels.

52. Apparatus according to claim 51, wherein pressure-applying rollers are provided, which protrude over the surface of the plate.

53. Apparatus according to claim 51 or 52, wherein the plate consists of a low-friction plastic or rubber.

54. Apparatus according to claim 31, wherein the filter belt is supported on a supporting belt which moves in unison with the filter belt and has open-topped filtrate channels, which extend at an angle to the direction of conveyance.

55. Apparatus according to claim 31, wherein the sludge chamber volume is defined by and between the filter belt and an upper revolving belt.

56. Apparatus according to claim 55, wherein the upper belt is a pressure-applying belt.

* * * * *

UNITED STATES PATENT AND TRADEMARK OFFICE
CERTIFICATE OF CORRECTION

PATENT NO. : 4,906,369
DATED : March 6, 1990
INVENTOR(S) : BÄHR

It is certified that error appears in the above-identified patent and that said Letters Patent is hereby corrected as shown below:

On the cover page, line 8 of the ABSTRACT, "fooding" should read --feeding--.

Column 1, line 61, "basket, the" should read --basket forming the stationary container, the--.

Column 4, line 1, "selling" should read --sealing--.

Column 13, line 16, "width" should read --length--;
line 36, "width" should read --length--.

Signed and Sealed this

Twenty-first Day of May, 1991

Attest:

HARRY F. MANBECK, JR.

Attesting Officer

Commissioner of Patents and Trademarks